United States Patent
O'Regan, Jr.

(10) Patent No.: US 8,246,829 B2
(45) Date of Patent: Aug. 21, 2012

(54) SYSTEMS AND METHODS FOR WATER TREATMENT AND REMEDIATION

(76) Inventor: Patrick T. O'Regan, Jr., Redwood Shores, CA (US)

( * ) Notice: Subject to any disclaimer, the term of this patent is extended or adjusted under 35 U.S.C. 154(b) by 216 days.

(21) Appl. No.: 12/599,683

(22) PCT Filed: May 8, 2008

(86) PCT No.: PCT/US2008/063131
§ 371 (c)(1),
(2), (4) Date: Nov. 10, 2009

(87) PCT Pub. No.: WO2008/141113
PCT Pub. Date: Nov. 20, 2008

(65) Prior Publication Data
US 2010/0155328 A1    Jun. 24, 2010

Related U.S. Application Data

(60) Provisional application No. 60/917,101, filed on May 10, 2007.

(51) Int. Cl.
*C02F 3/00* (2006.01)
(52) U.S. Cl. ........ 210/605; 210/630; 210/620; 210/628; 210/614; 210/143
(58) Field of Classification Search .................. 210/605, 210/630, 620–628, 614, 143
See application file for complete search history.

(56) References Cited

U.S. PATENT DOCUMENTS

| | | | |
|---|---|---|---|
| 3,764,523 | A | 10/1973 | Stankewich, Jr. |
| 3,930,998 | A | 1/1976 | Knopp et al. |
| 3,950,249 | A | 4/1976 | Eger |
| 3,960,717 | A | 6/1976 | Wyatt |
| 3,964,998 | A | 6/1976 | Barnard |
| 3,994,802 | A | 11/1976 | Casey et al. |
| 4,056,465 | A | 11/1977 | Spector |
| 4,132,637 | A | 1/1979 | Key et al. |
| 4,153,544 | A | 5/1979 | Okada et al. |
| 4,160,723 | A | 7/1979 | Kovacs |
| 4,162,153 | A | 7/1979 | Spector |
| 4,173,531 | A | 11/1979 | Matsch et al. |

(Continued)

FOREIGN PATENT DOCUMENTS

CN    101104541 A    1/2008
(Continued)

OTHER PUBLICATIONS

Khudenko Borris M, "Counterflow Microbiological Processes", "Counterflow Microbiological Processes", Jul. 20, 1995, p. 65 Publisher: WIPO, Published in: US.

*Primary Examiner* — Chester Barry
(74) *Attorney, Agent, or Firm* — West & Associates, A PC; Stuart J. West; Shaun N. Sluman

(57) ABSTRACT

A modularizable system for residential water treatment having a low energy requirement to process water for reuse at the residence which results in a reduction in the amount of fossil fuels required to power large water processing stations and transfer water from water plants to individual residences is disclosed. The system increases availability of water at the residential level in areas where water is a limited or limiting resource (e.g., in arid climates). Furthermore, the amount of water a residence uses in a given cycle is more efficient.

22 Claims, 12 Drawing Sheets

U.S. PATENT DOCUMENTS

| | | |
|---|---|---|
| 4,202,763 A | 5/1980 | Shimizu et al. |
| 4,415,454 A | 11/1983 | Fuchs |
| 4,479,876 A | 10/1984 | Fuchs |
| 4,568,462 A | 2/1986 | Bohnke et al. |
| RE32,429 E | 6/1987 | Spector |
| 4,693,827 A | 9/1987 | Mordorski |
| 4,895,645 A | 1/1990 | Zorich |
| 4,961,854 A | 10/1990 | Wittman et al. |
| 4,975,197 A | 12/1990 | Wittman et al. |
| 5,013,442 A | 5/1991 | Davis et al. |
| 5,240,597 A | 8/1993 | Ueda |
| 5,316,832 A | 5/1994 | Groten et al. |
| 5,382,369 A | 1/1995 | Vion |
| 5,407,566 A | 4/1995 | Tambo et al. |
| 5,472,611 A | 12/1995 | von Nordenskjold et al. |
| 5,531,896 A | 7/1996 | Tambo et al. |
| 5,607,593 A | 3/1997 | Cote et al. |
| 5,624,562 A * | 4/1997 | Scroggins ............... 210/605 |
| 5,654,198 A | 8/1997 | Carrier et al. |
| 5,658,993 A | 8/1997 | Denzinger et al. |
| 5,792,360 A | 8/1998 | Algar |
| 5,837,142 A | 11/1998 | Mullerheim et al. |
| 5,855,775 A | 1/1999 | Kerfoot |
| 6,083,407 A | 7/2000 | Kerfoot |
| 6,099,731 A | 8/2000 | Uchiyama et al. |
| 6,132,629 A | 10/2000 | Boley |
| 6,144,789 A | 11/2000 | Engelberth et al. |
| 6,146,524 A | 11/2000 | Story |
| 6,150,618 A | 11/2000 | Chou |
| 6,183,643 B1 | 2/2001 | Goodley |
| 6,276,304 B1 | 8/2001 | Tai |
| 6,280,633 B1 | 8/2001 | Conrad et al. |
| 6,284,143 B1 | 9/2001 | Kerfoot |
| 6,295,864 B1 | 10/2001 | You et al. |
| 6,306,296 B1 | 10/2001 | Kerfoot |
| 6,312,588 B1 | 11/2001 | Conrad et al. |
| 6,312,605 B1 | 11/2001 | Kerfoot |
| 6,337,020 B1 | 1/2002 | Thieblin et al. |
| 6,406,629 B1 | 6/2002 | Husain et al. |
| 6,428,710 B1 | 8/2002 | Kempen et al. |
| 6,436,285 B1 | 8/2002 | Kerfoot |
| 6,447,646 B1 | 9/2002 | Hassinen et al. |
| 6,468,953 B1 | 10/2002 | Hitchems et al. |
| 6,485,645 B1 | 11/2002 | Husain et al. |
| 6,485,646 B1 | 11/2002 | Dijkman et al. |
| 6,485,696 B1 | 11/2002 | Sato et al. |
| 6,536,272 B1 | 3/2003 | Houston et al. |
| 6,539,772 B1 | 4/2003 | Parks et al. |
| 6,551,518 B2 | 4/2003 | Gargas |
| 6,561,048 B2 | 5/2003 | Schumacher et al. |
| 6,592,762 B2 | 7/2003 | Smith |
| 6,602,417 B1 | 8/2003 | Zilverentant |
| 6,610,983 B2 | 8/2003 | Toomey |
| 6,706,185 B2 | 3/2004 | Goel et al. |
| 6,761,825 B2 | 7/2004 | Kirk |
| 6,780,331 B2 | 8/2004 | Galatro et al. |
| 6,787,043 B1 | 9/2004 | Cho et al. |
| 6,796,436 B2 | 9/2004 | Carson et al. |
| 6,814,877 B2 | 11/2004 | Gargas |
| 6,921,476 B2 | 7/2005 | Abe et al. |
| 7,005,069 B2 | 2/2006 | Shell |
| 7,008,539 B2 | 3/2006 | Johnson et al. |
| 7,008,543 B2 | 3/2006 | Newkirk et al. |
| 7,011,750 B2 | 3/2006 | Kitayama et al. |
| 7,012,394 B2 | 3/2006 | Moore et al. |
| 7,014,173 B2 | 3/2006 | Rabie et al. |
| 7,014,769 B1 | 3/2006 | Cox et al. |
| 7,018,532 B2 | 3/2006 | Kaufman |
| 7,022,223 B2 | 4/2006 | Lovestead et al. |
| 7,033,503 B2 | 4/2006 | Park et al. |
| 7,041,214 B2 | 5/2006 | Lee et al. |
| 7,041,219 B2 | 5/2006 | Tharp et al. |
| 7,052,610 B2 | 5/2006 | Janson et al. |
| 7,060,185 B2 | 6/2006 | Kim et al. |
| 7,063,786 B2 | 6/2006 | Zhao et al. |
| 7,063,788 B2 | 6/2006 | Mahendran et al. |
| 7,067,086 B2 | 6/2006 | Huhn et al. |
| RE39,203 E | 7/2006 | McKinney |
| 7,070,005 B2 | 7/2006 | Maas et al. |
| 7,077,958 B2 | 7/2006 | Metsänen |
| 7,086,280 B2 | 8/2006 | Wakeman et al. |
| 7,096,968 B2 | 8/2006 | Maas et al. |
| 7,100,683 B2 | 9/2006 | Heilmann et al. |
| 7,114,844 B2 | 10/2006 | Weetman |
| 2002/0107658 A1 * | 8/2002 | McCall et al. ............. 702/141 |
| 2002/0148779 A1 | 10/2002 | Shieh |
| 2003/0015469 A1 | 1/2003 | Hedenland |
| 2003/0234219 A1 | 12/2003 | Verma |
| 2004/0006277 A1 * | 1/2004 | Langenhove et al. ......... 600/481 |
| 2004/0099599 A1 * | 5/2004 | Van Vliet et al. ............ 210/603 |
| 2004/0173524 A1 | 9/2004 | Hedegaard |
| 2005/0189209 A1 | 9/2005 | Craven |
| 2005/0252855 A1 | 11/2005 | Shieh |
| 2006/0076226 A1 | 4/2006 | Marcellus |
| 2006/0076294 A1 | 4/2006 | Sirkar et al. |
| 2006/0124543 A1 | 6/2006 | Pehrson et al. |
| 2006/0144789 A1 | 7/2006 | Cath et al. |
| 2006/0254979 A1 | 11/2006 | Koopmans |
| 2009/0119057 A1 * | 5/2009 | Alexandrov et al. ......... 702/136 |

FOREIGN PATENT DOCUMENTS

| | | |
|---|---|---|
| DE | 4024947 A1 | 2/1992 |
| DE | 4415602 A1 | 11/1995 |
| DE | 4444335 A1 | 6/1996 |
| DE | 19917955 A | 10/2000 |
| DE | 10034645 A1 | 1/2001 |
| EP | 1375436 A1 | 1/2004 |
| EP | 1376276 A | 1/2004 |
| JP | 04235788 A | 8/1992 |
| JP | 05192678 A | 8/1993 |
| JP | 07308692 A | 11/1995 |
| KR | 2002-0018751 A | 3/2002 |
| KR | 10-0486782 B1 | 5/2005 |
| WO | WO 95/03254 A | 2/1995 |
| WO | WO 2005/095287 A1 | 10/2005 |
| WO | WO 2008/141113 A1 | 11/2008 |

* cited by examiner

*Prior Art*

SYSTEMS AND METHODS FOR WATER TREATMENT AND REMEDIATION

CROSS-REFERENCE

This application claims the benefit of PCT Patent Application PCT/US2008/063131 filed May 8, 2008, which claims the benefit of U.S. Provisional Application No. 60/917,101, filed May 10, 2007, which application is incorporated herein by reference.

BACKGROUND OF THE INVENTION

1. Field of the Invention

The invention relates to methods, systems, devices and components for treating and reusing water in smaller venues. Small venues are, for example residential and small business. The invention relates more specifically to modularizable systems, components and methods for treating water available residentially for reuse and/or irrigation. Water sources suitable for the invention include blue water, black water, gray water, and water obtained through natural sources (such as rainfall, storm water runoff, and the like).

2. Description of the Background

With our increasing awareness of environmental issues, such as global warming, a need has been recognized for ways to preserve and efficiently use our natural resources. Large focus and effort has been placed on reduction of dependence on fossil fuel for energy. However, the importance of the limited supply of another critical resource has remained largely underappreciated. That resource is water.

It is estimated greater than 75% of the earth's surface is covered in water, however, only a small fraction of that water is drinkable or usable without treatment. Over 96% of water is ocean, seas and bays. Of the 4% of fresh water, 68.7% is trapped in ice caps, glaciers and permanent snow. (See, earthobservatory.nasa.gov) For example, salt water, which represents the vast majority of water, requires desalination before it is can be used for drinking or other purposes. See, US Pub 20060144789 to Cath for System and Methods for Purification of Liquids; 20060076294 to Sirkar for Devices and Methods Using Direct Contact Membrane Distillation and Vacuum Membrane Distillation; 20060076226 to Marcellus for Machine for desalinating salt water, brine water and impure water and the process for making same and a plant for making same; 20050189209 to Craven for Fresh Water Extraction Device. The desalination process requires a considerable amount of energy to accomplish. According to the California Coastal Commission, the cost of desalination ranges from 2,500-15,000 kWh/AF (kilowatt hour per acre foot). (See, http://www.coastal.ca.gov/desalrpt/dchap1.html).

Once water has been used in a residential and/or commercial environment, the resulting water can require elaborate, energy consuming, treatment before it is useable and/or reusable. Even lake and stream water can carry pathogens capable of making humans sick and therefore treatment and/or processing of the water to make it safe for human consumption is appropriate.

The typical wastewater stream contains both carbonaceous compounds and nitrogenous compounds (generally present as $NH_4^+$) exerting an oxygen demand and measured as a biological oxygen demand (BOD). BOD is a chemical procedure for determining how fast biological organisms use oxygen (through degradation of organic material) in a body of water. It is used in water quality management and assessment, ecology and environmental science. A $BOD_5$ test measures the rate of oxygen update by micro-organisms in a sample of water at a temperature of 20° C. and over an elapsed period of five days in the dark.

In many areas compliance with water pollution control laws requires that wastewater treatment objectives consider the removal of both nitrogen and phosphorus in addition to the normal reduction of carbonaceous compounds and suspended solids. Phosphorus and nitrogen-containing compounds are essential nutrients for cellular growth. As such, continuous release of phosphorous and nitrogen containing water into natural receiving waters such as rivers and streams has resulted in progressive fertilization and eutrophication, thereby creating ubiquitous blooms of aquatic vegetation. This, in turn, has endangered aquatic life and caused a gradual degradation of the quality and esthetics of the water. Since the ultimate growth of these aquatic blooms depends on nutrient availability, reduction in the levels of phosphorus and nitrogeneous compounds would limit such undesirable growth.

Recent demands from governmental agencies are requiring improved purification of their waste water. Among others there are focus on organic compounds, phosphorous compounds and nitrogen containing compounds. The phosphorous compounds are often removed by an oxidative precipitation in which chemicals are added to the waste water and oxidize the phosphorous compounds to phosphates which are precipitated as sparingly soluble salts. The phosphorous compounds are normally either precipitated in a separate tank or in the septic tank Furthermore, many countries in the world have serious health consequences from inadequate access to clean water and/or sufficient water for bathing and cleaning. Efforts have been taken on the part of NGOs such as Rotary International to address the need to increase access to reliable and safe water (See, http://www.rotaryorg/aboutrotary/president/boyd/water.html). In developing countries, part of the problem stems from the inaccessibility to municipal infrastructure providing access within the residential setting to blue water (i.e., water that is safe and useful for cooking, cleaning, bathing, and drinking). However, even in the United States and Europe there is an increasing awareness that regardless of how well designed the municipal infrastructure, access to water, and its limited availability in some regions, has far reaching impact on the community and the economy. In the U.S., it was recently reported that Las Vegas, one of the fastest growing metropolitan areas in the United States, is predicted to run out of water by 2016.

Typically, in the United States, many homes are connected to a municipal water source that provides an incoming stream of water, referred to as "blue water." The U.S. Environmental Protection Agency (USEPA) sets the standard for water by enforces federal clean water and safe drinking water laws enforcing federal clean water and safe drinking water laws. There is no such thing as naturally pure water. In nature, all water contains some impurities. As water flows in streams, sits in lakes, and filters through layers of soil and rock in the ground, it dissolves or absorbs the substances that it touches. Some of these substances are harmless. In fact, some people prefer mineral water precisely because minerals give it an appealing taste. However, at certain levels minerals, just like man-made chemicals, are considered contaminants that can make water unpalatable or even unsafe.

Some contaminants come from erosion of natural rock formations. Other contaminants are substances discharged from factories, applied to farmlands, or used by consumers in their homes and yards. Sources of contaminants might be in your neighborhood or might be many miles away. Your local water quality report tells which contaminants are in your drinking water, the levels at which they were found, and the actual or likely source of each contaminant.

Some ground water systems have established wellhead protection programs to prevent substances from contaminating their wells. Similarly, some surface water systems protect the watershed around their reservoir to prevent contamination. Right now, states and water suppliers are working systematically to assess every source of drinking water and to identify potential sources of contaminants. This process will help communities to protect their drinking water supplies from contamination, and a summary of the results will be in future water quality reports.

Blue water is suitable for a variety of household uses and, because of the manner in which homes and business are plumbed, is used for applications that do not require the quality of blue water, e.g. watering the lawn, flushing toilets, etc. As water is used in a typical household, different qualities of water come out. Three qualities of water typically exit the system intermingled into either a municipal sewage system or a septic system. These three types include: blue water, e.g. where a tap of incoming blue water is run until it gets hot before pulling the stopper in the tub; gray water, e.g., water from the laundry, shower, bathroom sink, etc. that might have some impurities; and black water, e.g. water from the kitchen sink, dishwasher, and toilet. According to the USEPA, on average in the United States, residences use 400 gallons of blue water per day, and about 30% is devoted to outdoor use, such as watering the lawns. Some experts estimate than more than 50% of commercial and residential irrigation water goes to waste due to evaporation, runoff; or over-watering. For purposes of illustration FIG. 1 illustrates a typical residential water usage set-up.

Many of the currently available systems are directed to commercial or municipal sized water treatment facilities. For example, U.S. Pat. No. 3,764,523 to Stankewich Jr. for Nitrification of BOD-Containing Water is directed to a method for removing both carbon and nitrogen food from BOD-containing water by biochemical oxidation using oxygen gas in the presence of activated sludge.

Other efforts have been made to promote awareness of water as a resource and at least make a crude effort to re-use gray water for landscape usage. For example, Art Ludwig's Create an Oasis with Greywater: Choosing, Building and Using Greywater Systems ($4^{th}$ Ed. February 2006), discusses a variety of ways to save fresh (blue) water and irrigate with wash water. New Water in Australia has developed the Aqua Reviva system, for treating and recycling household graywater, and Rain Reviva system, for collecting and storing rainwater under a house (see, www.newwater.com.au). See, PCT Publication WO 2005/095287 to New Water Corporation for Water Treatment. The Aqua Reviva system comprises a collection cell to balance out variation and composition of gray water over the day, with an automatic overflow to the sewer. Composite gray water is then pumped through a hair and lint trap to a treatment cell where biological treatment, together with chemical and physical removal processes take place. The treated effluent is then disinfected via a mild bromine disinfection process and held a minimum of 30 minutes. Thereafter the effluent passes to a reuse cell which is sized to suite a household's reuse requirements. The treatment cell has three replaceable cartridges each capable of treating up to 235 liter/day, with a total capacity of 700 liter/day. Another system developed by Oasis ClearWater New Zealand is the Clearwater Series 2000 (see, www.oasisclearwater.co.nz). The ClearWater system is not a septic tank. It is an aerated wastewater treatment system comprising five stages of treatment. Liquid flows through the system by hydraulic disbursement. The wastewater first enters a pretreatment, settlement chamber. From there it flows into a secondary settlement chamber. From the secondary settlement chamber it passes through a filter where biological and mechanical filtration occurs. From there it passes to a central aeration chamber and then to a clarifier unit. Still another system for aerated wastewater treatment has been developed by Aqua-nova in Australia (see, www.aquanova.com.au). The Aqua-nova system is also a wastewater treatment process. Yet another system is developed by BioKube in Denmark (see, www. Biokube.com). The BioKube system provides for biological cleaning of sewage water to create water that is reusable for irrigation. The BioKube system breaks down hydrogen sulphide in a pre-settlement tank, prior to pumping the wastewater into a cleaning tank. See also, U.S. Patent Publication 2004/0173524 to Hedegaard for Method of Biologically Purifying Waste Water and a Plant Preferably a Mini Purification Plant to be Used by the Method.

SUMMARY OF THE INVENTION

An aspect of the invention is directed to a low-maintenance, modularizable system configurable for residential use for treatment of black water, gray water and natural source water. The invention includes systems and methods for performing source separation of the water, heavy filtration (e.g., filtration of large particulate matter items), processing in a surge tank for additional separation of materials, transferring to an aeration tank, final filtration, and optional final purification step. The invention relates to methods and systems for treating and using water residentially.

One advantage of providing a modularizable system for residential water treatment is the low energy requirement to process water for reuse at the residence which results in a reduction in the amount of fossil fuels required to power large water processing stations and transfer water from water plants to individual residences. Another advantage is the increased availability of water at the residential level in areas where water is a limited or limiting resource (e.g., in arid climates). Still another advantage of the invention is a reduction for a residence in the amount of water a residence uses in a given cycle due to more efficient reuse. Yet another advantage of the invention is the reallocation of water by quality for usage, e.g., use of treated gray water for lawn care instead of blue water.

An aspect of the invention is directed to a water treatment system. The water treatment system comprises a settlement tank adaptable to receive effluent from a source; at least one aerobic treatment tank configurable to receive a settlement tank effluent; a disinfector adaptable to disinfect an effluent from at least one of an anaerobic treatment tank and an aerobic treatment tank; a tester configurable to test a parameter; and a controller configurable to control a process of the water treatment system in response to the tested parameter.

The anaerobic treatment tank is adaptable to be in communication with an anaerobic digester. Additionally, the anaerobic digester receives sludge from the anaerobic treatment tank. Furthermore, a parameter of an anaerobic bacterial activity can be sensed by the tester. Bacterial activity can then be adjusted by a controller in response to the sensed parameter. Moreover, the aeration tank can be configured such that it is in communication with an aeration source. The aeration source can furthermore be configurable to deliver an aeration substance. Suitable substances include, for example: air, purified oxygen, and ozone. The rate at which the aeration source delivers the aeration substance, or the rate of the water flow, can be controlled by a regulator. Furthermore, in another aspect, a parameter of the aeration tank is sensed by the tester. For example, the rate at which the aeration substance is controlled, or the flow rate of the water through the system, is determined in response to a parameter measured by the tester. The disinfector can be one or more of an ozonator, an ultraviolet light source, a heat source, a distillation system, a reverse osmosis system, and/or a chemical treatment processor. In some embodiments, the disinfector is activated in response to a parameter measured by the tester. Furthermore, the system can be adapted to test one or more of total dissolved solids, electrical conductivity, temperature, color, turbidity, hardness, sediments, acidity, basicity, calcium concentration, magnesium concentration, sodium concentration, carbonate concentration, chloride concentration, sulphate concentration, sodium absorption ration, boron concentration, trace metal concentration, heavy metal concentration, nitrate-nitrogen concentration, phosphate-phosphorus concentration, potassium concentration, pharmaceutical compounds, hormones, and/or metabolic by-products. The tester can be controlled by a timer and is configurable to test at a time interval. Furthermore the tester is configurable to provide real-time testing data to the controller, if desired.

Another aspect of the invention discloses a water treatment method. The method comprises: receiving an effluent from a source; aerobically treating the effluent received from the source; testing a parameter of the aerobically treated effluent; and adjusting the aerobic treatment of the effluent in response to a result of the tested parameter. The method can also include anaerobically treating the effluent from the source. Additional method can comprising the step of adding a reaction controlling substance. Additionally, the step of adding a reaction controlling substance is in response to the result of the tested parameter. One or more filtration steps can be provided as well as one or more sterilization steps or processes. The sterilization step can be selected from an ozonator, a UV light source, a heat source, a distillation system, a reverse osmosis system, and/or a chemical treatment processor. Furthermore, one or more sterilization steps or processes can be selected which are then performed the sterilization in sequence, in parallel, or selectively in response to a tested parameter. Furthermore in some embodiments, the output from the system is tested. In other embodiments, the output of the system is reused onsite. Additionally, the step of separating the effluent received from a source can be performed.

INCORPORATION BY REFERENCE

All publications, patents, and patent applications mentioned in this specification are herein incorporated by reference to the same extent as if each individual publication, patent or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
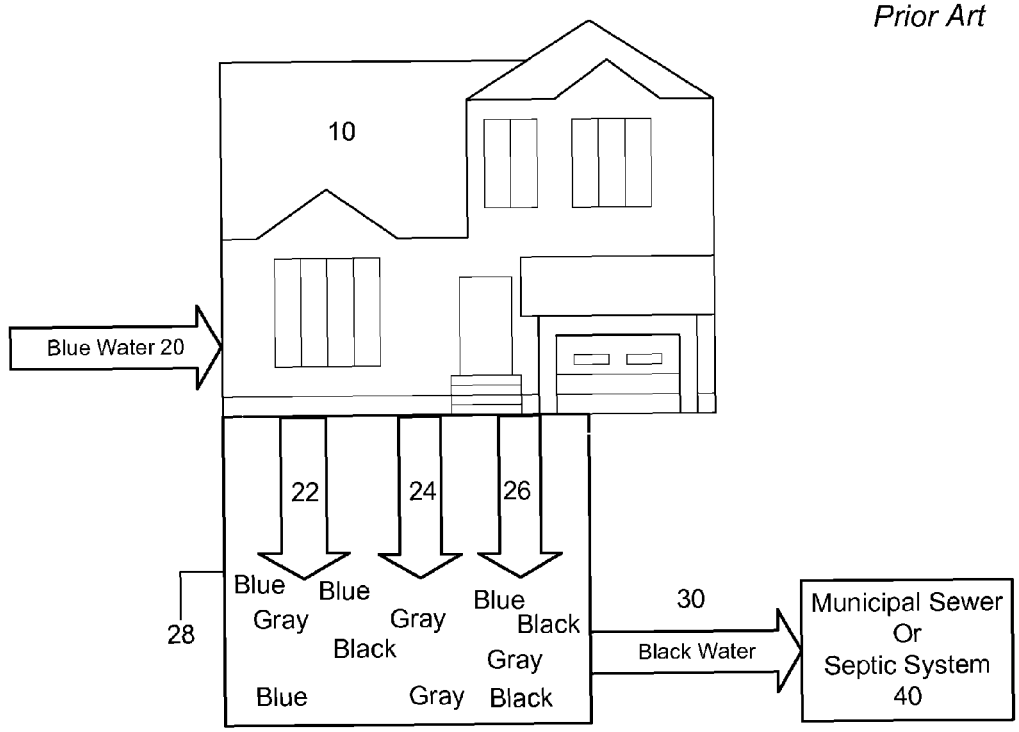
FIGS. 1a-d illustrate a residential water usage system connected to a municipal sewer or traditional septic system, as described in the background, a rain water catchment system currently in use, a depiction of the components of water effluent from a typical home and a representation of soil layers.
Figure 1B:
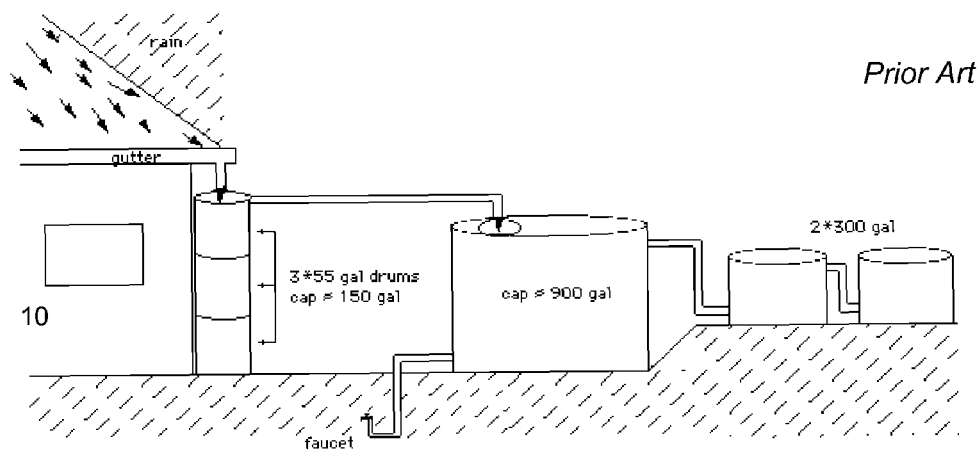

Turning now to FIG. 1b a rainwater catchment system is shown that collects rainwater using gravity flow pressure principles. For example, rainwater runs off the roof of the house into rain gutters. The gutters then channel the water and empty it into a standpipe. When the standpipe has reached its capacity of 150 gallon, the overflow runs through a pipe and empties into a 900 gallon drum. Two 300 gallon barrels collect the overflow from the 900 gallon drum and any other overflow drains to the public sewer system. Spigots are built into the bottom of the standpipe and the 900 gallon drum. The pressure of the water in the standpipe and the drum pushes the water out when the spigots are opened. For example, to configure a system a garage roof of 42'×48', pitched at about 1 to 2, is used as a collector. During a light rainfall 400 gallons a day can be collected. During heavy rains 1500 gallons can be collected in a few hours. A rule of thumb calculation for square footage vs. amount collected is, approximately, 400 gallons of water per 1" rainfall, on our 25×40 foot garage roof.

Figure 1C:
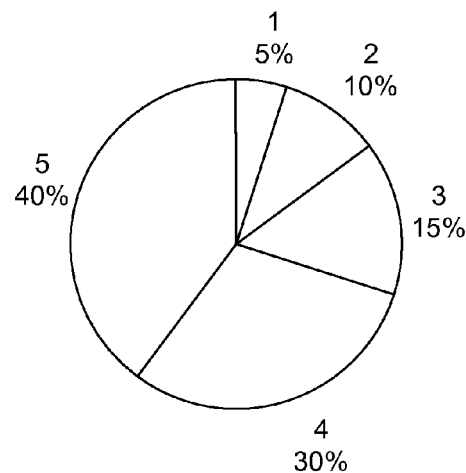
Figure 1D:
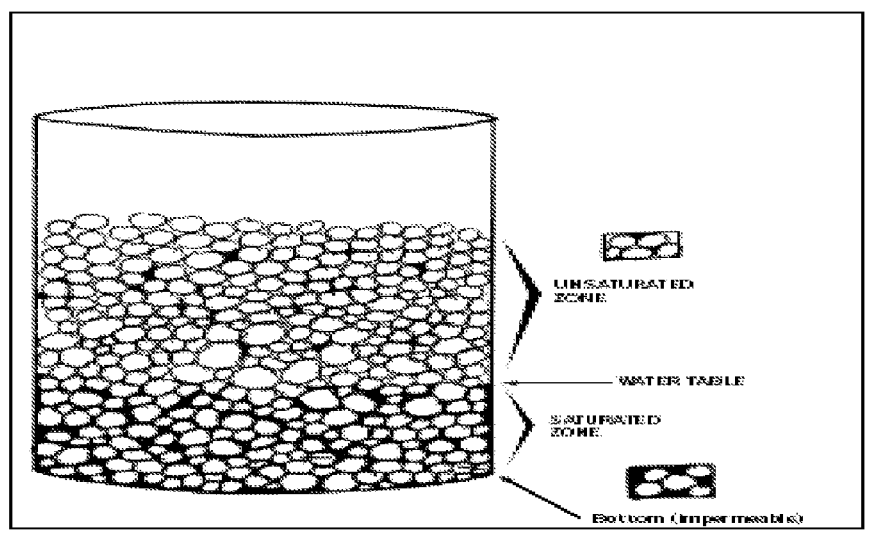

Gray water is all waste water except toilet and food waste derived from garbage disposals. Gray water is characterized in that it contains less nitrogen than the nitrogen in black water, i.e., water from a toilet. As would be appreciated by those skilled in the art, nitrogen is one of the most serious and difficult to remove pollutants affecting any potential drinking water supply. Additionally, gray water contains fewer pathogens capable of spreading organisms via water. Finally, gray water decomposes faster than black water. As illustrated in FIG. 1c, gray water is typically comprised of 5% miscellaneous components 1, 10% kitchen water 2, 15% laundry water 3, and 30% bathing water 4. The remaining water used in a typical home, 40%, is from the toilet. The gray water typically has 50% Phosphorus, 10% Nitrogen and 40% chemical oxygen demand, whereas black water has 50% Phosphorous, 90% Nitrogen and 60% chemical oxygen demand. Water that is discharged onto soil passes through an unsaturated zone before reaching the water table and a saturated zone, as shown in FIG. 1d. Thus the water is essentially filtered by a natural process similar to that of rain water, by essentially a natural process by passing through soil, rock, etc.

In most systems supplying water to residents, including municipal systems, water is obtained from a source 210 such as a well, river, lake, reservoir, or municipal water source. The water is then conveyed by a water conveyance system 212. Typically water is subjected to some level of treatment 214 before being distributed 216 to the end user 220. Once the end user uses the water, e.g., by showering, laundry, cooking, etc., collectable water is collected 220 and transferred to a wastewater treatment plant 224. The treated water is then either discharged 226, e.g., back into the source 210, or the recycled water goes through a tertiary cleaning 230 and is then distributed 232 for use by an end user. This secondary, post tertiary treatment use is typically municipal use such as watering greens. See, for example, Redwood City Calif. background on Recycled Water, available at http://www.redwoodcity.org/publicworks/water/recycling/background.htm.

As shown in Table 1, the California Energy Commission reported that the energy used in the water delivery cycle is as follows:

TABLE 1

RANGE OF ENERGY INTENSITIES FOR WATER-USE CYCLE SEGMENTS

| Water-Use Cycle Segments | Range and Percentage of Energy Intensity (kWh/MG) | | | |
| --- | --- | --- | --- | --- |
| | Low | Percentage | High | Percentage |
| Water Supply and Conveyance (212) | 0 | 0 | 14000 | 37.42% |
| Water Treatment (214) | 100 | 4.35% | 16000 | 42.77% |
| Water Distribution (216) | 700 | 30.43% | 1200 | 3.21% |
| Wastewater Collection and Treatment (220, 224) | 1100 | 47.83% | 4600 | 12.30% |
| Wastewater Discharge (226) | 0 | 0% | 400 | 1.10% |
| Recycled Water Treatment and Distributions (230, 232) | 400 | 17.39% | 1200 | 3.20% |
| TOTAL | 2300 | 100% | 37400 | 100% |

See, California's Water-Energy Relationship (WER), Table 1-2, p. 9 (publication CEC-700-2005-011-SF). The majority of energy used to deliver water to an end user occurs during the first three steps of water supply and conveyance, water treatment and water distribution. Moderate amounts are used in collection, discharge and recycled water treatment and distribution. In urban Texas, for example, about 25% of water usage by an end user is for landscaping purposes alone, while the USEPA estimates on average about 30% is devoted to outdoor use. Additionally, 40-60% of the water that is used for other than landscape irrigation and returned to a municipal system is essentially gray water (as evident from FIG. 1C). Thus, reducing the amount of water supplied in turn reduces the amount of energy required to transport the water.

Figure 3A:
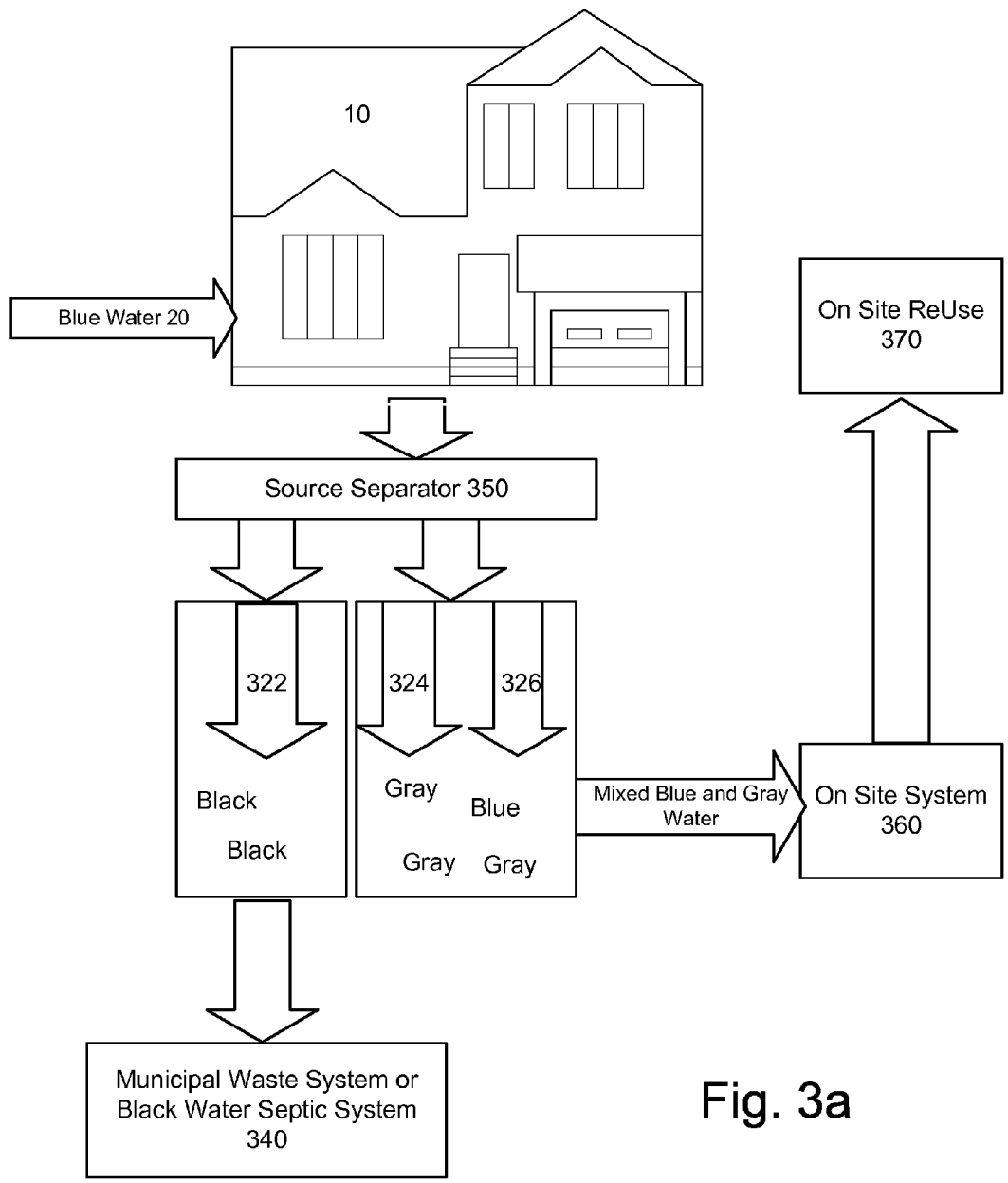
FIGS. 3a-d illustrate several system designs for treating water onsite.

FIGS. 3a-d illustrate a variety of operational designs for the systems of the invention. In FIG. 3a, blue water 20 is received from a source, for example a municipal water supply or well water, into a house 10, condominium, townhouse, or small commercial venue. The water 20 is used onsite by the user and the used water exits the house. The exiting water can be source separated 350, for example, by separately plumbing the water sources or by providing one or more sensors in line to identify the quality of the water as either black water 322, (e.g., 90% nitrogen and 60% chemical oxygen demand) or gray water 324 and blue water 326 (e.g., 10% nitrogen and 40% chemical oxygen demand). The water is then, for example, either directed to the municipal waste system or an onsite black water septic system 340, as would be the case for the black water, or to an onsite water system 360, as is the case with the gray water 324 or gray water mixed with blue water 326. Once the water has been processed by the onsite water system 360 it is used onsite 370 to, for example, water the lawn, thereby replenishing the water table locally. This immediate onsite use, reduces the demand for water up to 30% and reduces the amount of energy required to deliver water based on the overall reduction in water delivery. Additionally, local use replenishes the water table reducing the impact of subsidence.

Figure 3B:
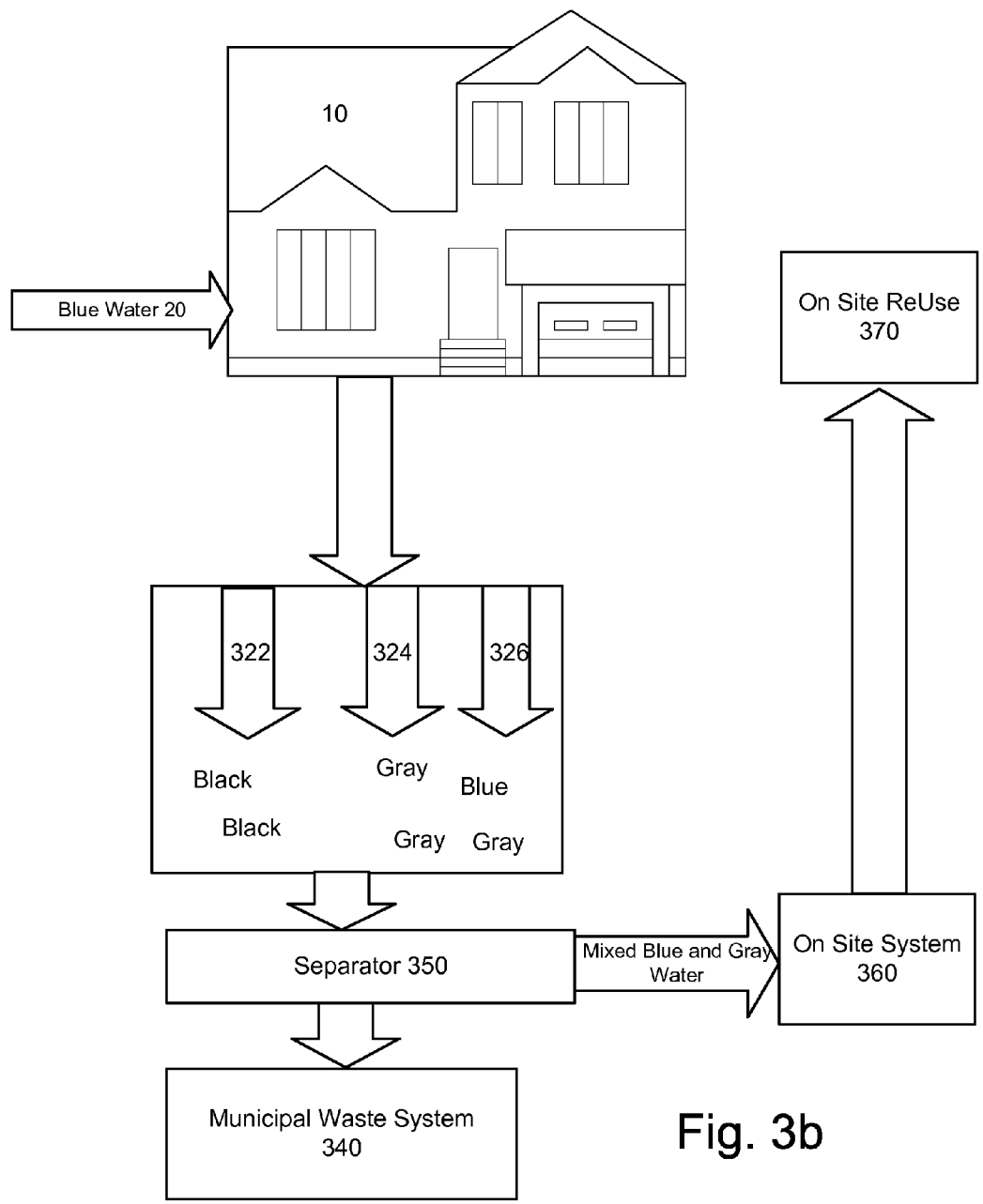

In another system, illustrated in FIG. 3b, the blue water and black water exits the house 10 and is then processed through a separator 350 configurable to separate the water based on its quality. The separator achieves separation of the water by use of a controller in communication with one or more sensors adapted to determine a parameter of the water exiting the house. Based on the measured parameter, the controller controls whether the water is processed by the gray water system or the black water/municipal system As with the previous system, the separated water is either transferred to, for example, a municipal waste system 340 or processed for re-use via an onsite system 360. Onsite use includes, for example landscape irrigation, both drip irrigation and traditional irrigation, as well as other household uses including, for example, laundry and bathroom.

Figure 3C:
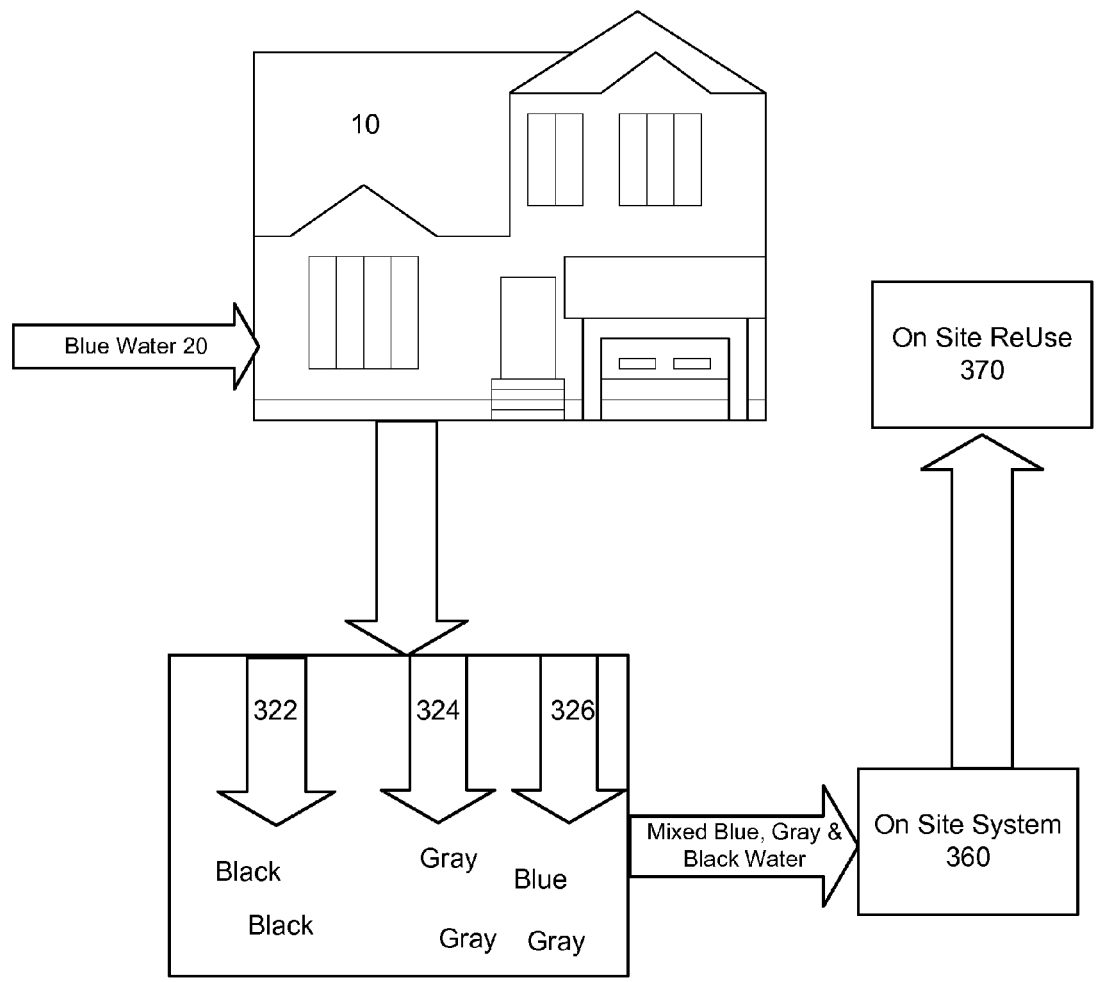
Figure 3D:
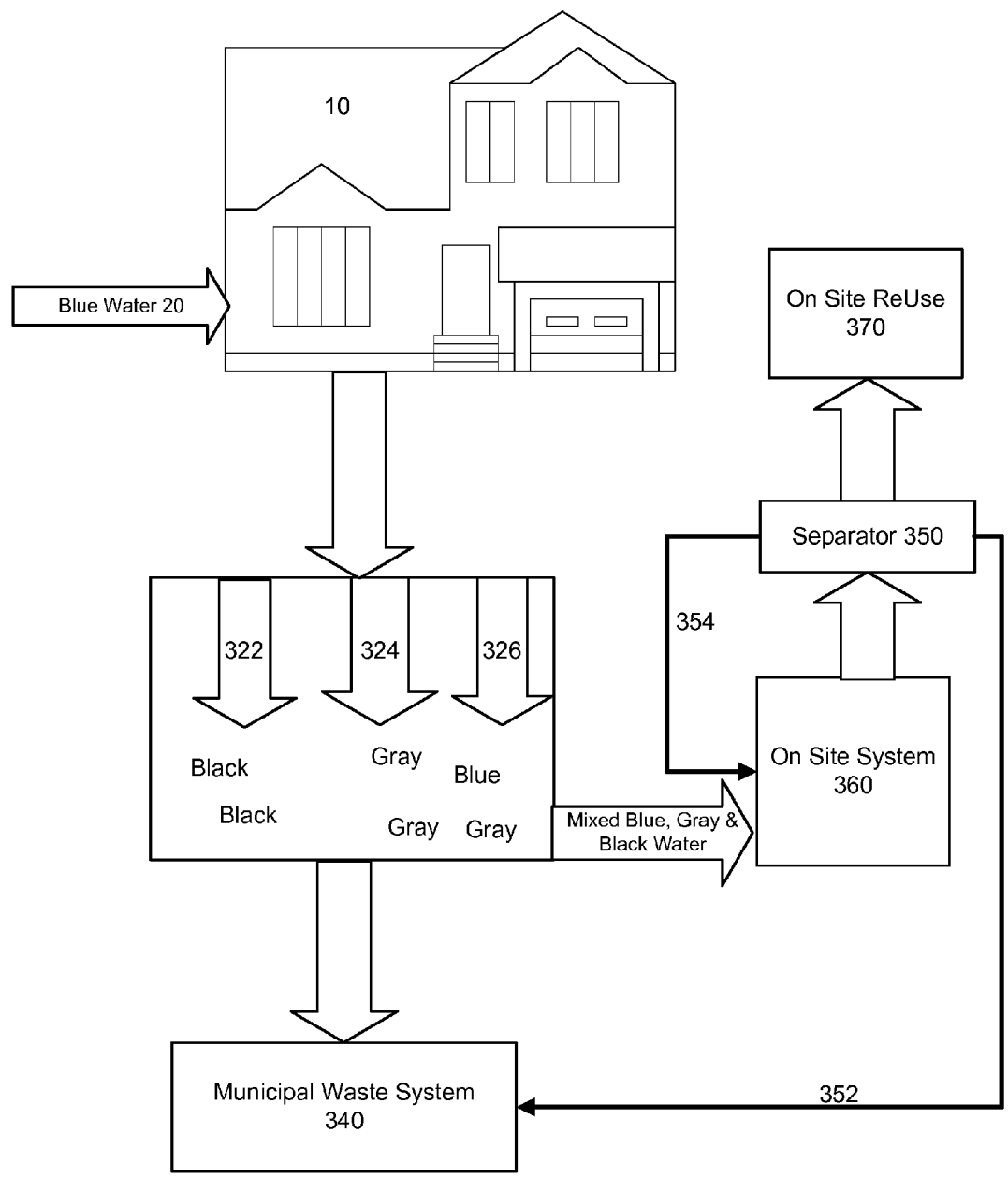

As shown in FIG. 3c, the water is not separated, but rather all of the water (gray water and black water) is treated onsite in a single system for direct re-use. In still another system, shown in FIG. 3d, the water is treated by the onsite system 360. After exiting the onsite system 360 the treated water is then optionally separated 350, if needed, depending upon whether the water is clean enough for onsite reuse. Water that is not clean enough for reuse is either returned to the onsite system 360 for further processing or delivered to, for example, the municipal waste system 340.

As will be appreciated by those skilled in the art, the separation portion of the system can operate by, for example, separating water in response to a result of a parameter sensed by a sensor position at one or more locations within the fluid stream. In response to the sensed parameter, a valve can be activated that directs the traveling fluid in one direction or another. By providing more than one sensor in line, a changing parameter can be detected early to activate the separator. Typically the separator will be activated such that if an undesirable parameter is detected, the separator will be activated early to ensure diversion of the detected fluid. This early diversion may also capture fluid that has, for example, gray water parameters. Furthermore, one or more separators can be provided in the system, such that separation occurs at more that one location during the process. The separator is typically controlled by a sensor connected to a controller.

Figure 4A:
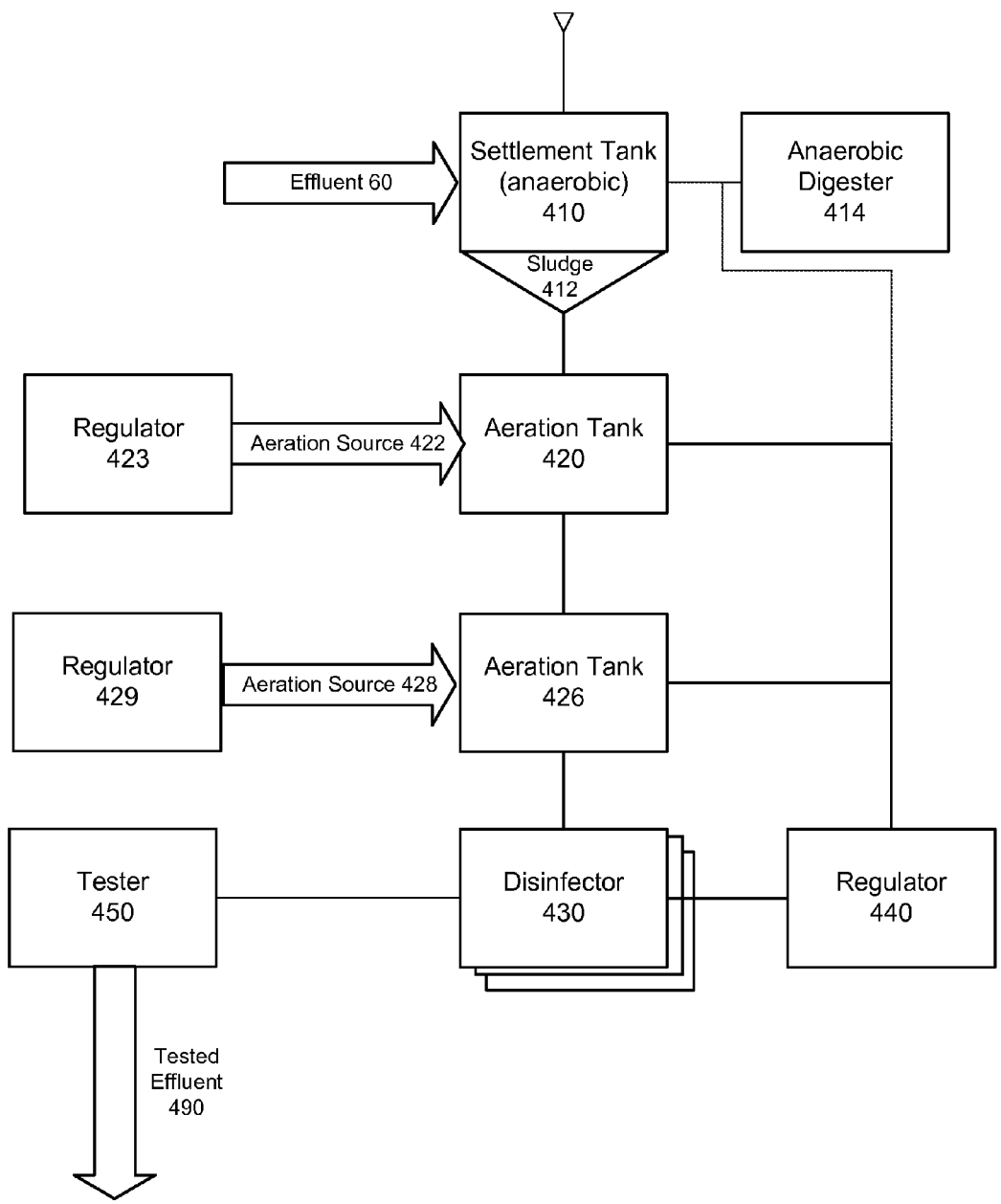
FIGS. 4a-b illustrate additional detail for an onsite treatment device.
Figure 4B:
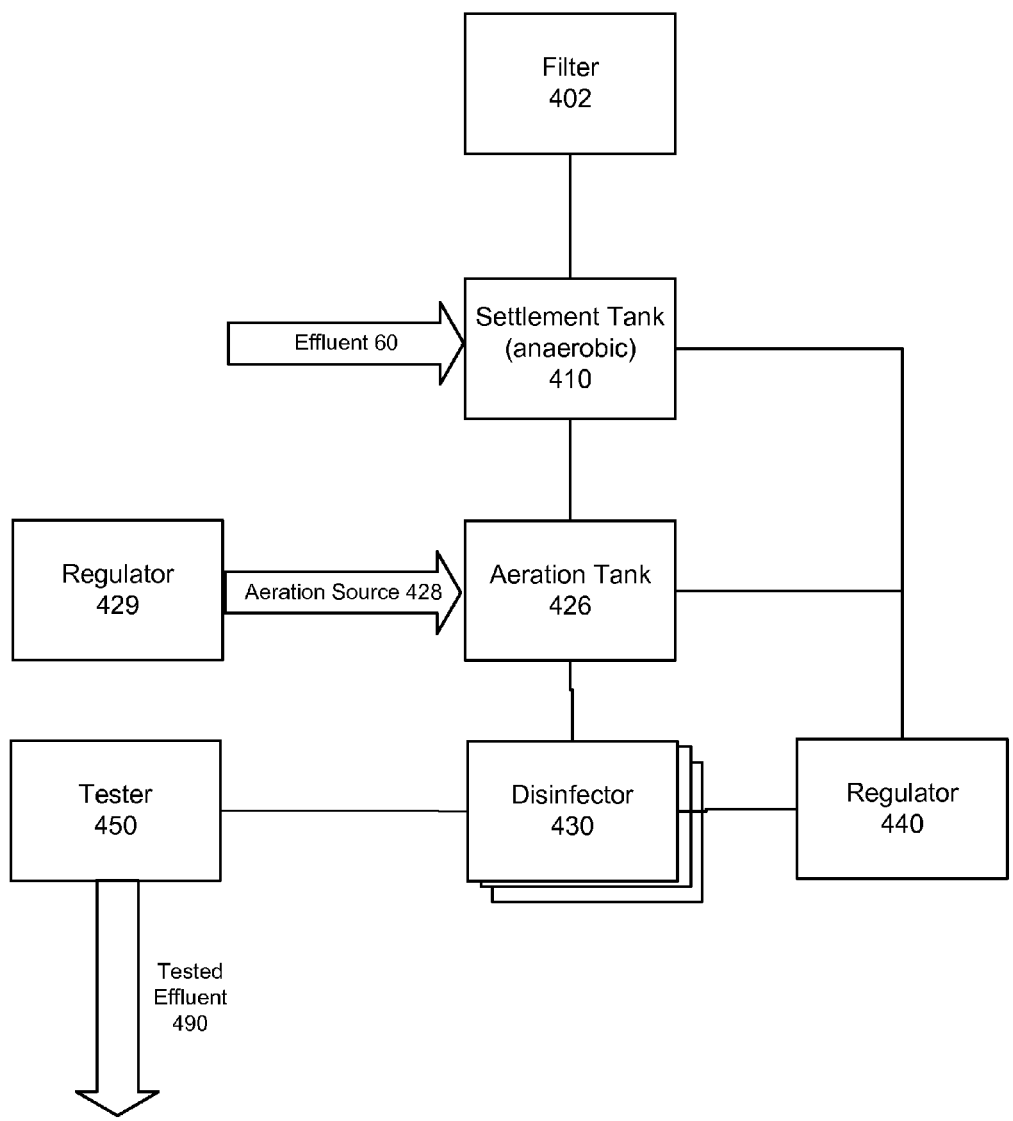

Turning now to FIGS. 4a-b, additional details of the onsite systems of FIGS. 3a-d are provided. Water comes into the system from a source 60. The water can flow though a biodegrading zone at such a rate that settlement occurs in a first step. A suitable rate can be determined by first determining the average settle rate of the particles in the water and then adjusting the flow rate by the use of a controller such that the water remains in the zone longer than it takes for an average particle to sink from the top of the zone to the bottom. The settlement can settle any desired fraction of the particles by adjusting the flow rate of water to settle rate for the desire fraction. The feed of the bacteria is also adjusted in response to the adjustment of the flow of the water. The source can be any water available from the site including, but not limited to, blue water, black water, gray water, rainwater (e.g., from a rainwater catchment system), and the like. Water is collected from one or more sources and collected in a settlement tank 410.

The settlement tank 410 is adaptable to connect to a controller and a power source. Sludge 412 from the settlement tank 410 collects at the bottom of the tank, or in a container in communication with the tank. The sludge 412 can be withdrawn from the tank and optionally processed through an anaerobic digester 414 in order to generate energy. From the settlement tank, fluid is passed to one or more aeration tanks 420, 426. The one or more tanks can be connected to one or more sources of aeration. Controlling the flow of wastewater traveling through the system over the time and/or the amount of aeration or ozonation can facilitate and optimize the conditions for the microorganisms as the "day rhythm peaks" are neutralized. As a result, better bacteria growth conditions are achieved which results in better purification of the water.

Aeration can further be controlled by one or more regulators 423, 429, or controllers. In some instances it may be desirable to have a single regulator and a single aeration source for two aeration tanks, in other configurations it may be desirable to have each aeration tank controlled by its own regulator and aeration source. Once the fluid passes through the one or more aeration tanks, the fluid is applied to one or more disinfectors. The disinfectors can be arranged in series or in parallel relative to the outflow of the aeration tank. The disinfector 430 can be, for example, an ozonator, ozonizer, a UV light source, a heat source, a distillation system, a reverse osmosis system, and/or a chemical treatment processor. Once the fluid passes through the one or more disinfectors, the fluid is tested 450 and the tested effluent 490, if sufficiently clean, is then reused onsite. Furthermore, where more than one disinfector is provided, the disinfector can be activated in series, in parallel or selectively activated in response to a parameter from the tester.

As will be appreciated by those skilled in the art, one or more testers can be provided. For example, a tester can also be configurable to test the water in the aeration tank. Suitable testers would be apparent to those skilled in the art and can include, for example, pH testers, bacteria testers, etc. to determine the water quality and whether and how much bacteria or other materials known to those skilled in the art that would impact the rate of the biological reaction should be added to assist in the water treatment process. Testing of the water can occur at timed intervals, e.g. in response to a controller, at several points along the process, if desired, including when water is initially placed into the tank. A timer can be configurable to communicate with the tester to facilitate timed testing of the water. The bacterial growth surface can then be configurable to expose bacteria to the water environment in the chamber in a time release fashion, by, for example, coating the surface with a material which dissolves over time to expose a predetermined amount of bacteria. In another embodiment, bacteria is maintained in a bacteria release container which then releases a selected amount of bacteria at intervals, either on demand, or as a result of time release.

The biological oxidation occurs in at least two stages. First, at least a portion of organic pollutants are at least partially gas-treated, e.g., by aeration, in the presence of activated sludge. Second, the treated wastewater-activated sludge mixture is discharged from the treatment stages, and divided in a post clarification stage into purified water and sludge. The sludge divided in the post clarification stage is at least partially recycled into the treatment stages.

The activated sludge method is typically a mixed system of bacteria and protozoa, wherein the bacteria in the activated sludge digests dissolved organic materials in waste water in an aeration tank, and the protozoa (such as *Vorticella, Epistylis, Opercularia, Carchesium, Paramecium*, and *Colpidium*) prey upon the propagated bacteria. Generation time of bacteria can be as short as 20 to 120 minutes, whereas the life span of the protozoa is, for example, as long as 10 hours in the case of *Paramecium*. An oxygen utilization rate is so low that a rate of air to be diffused into an aeration tank is low, and an estimated OTR value is about 1 mmol $O_2$/l hr at most. Thus, the treating rate is low, and a treatment of waste water containing organic materials at a high concentration is difficult.

In some embodiments, activated sludge consisting mainly of bacteria having a short generation time, that is, a high growth rate, and carried out waste water treatments by increasing an OTR value to a liquid in an aeration tank, acclimating activated sludge, and particularly utilizing a flocculant consisting mainly of bacteria may be desirable. A high-efficient activated sludge treatment of waste water containing organic materials can then be carried out by introducing the waste water into an aeration tank, and effecting aeration treatment of the waste water by supplying oxygen (which may be in the form of air, or ozone) to the tank in the presence of activated sludge, where the oxidation of the organic materials is carried out at an oxygen transfer rate of 5 to 80 mmol $O_2$/l·hr to the tank, and especially a flocculant consisting mainly of bacteria is formed at an oxygen transfer rate of at least 10 mmol $O_2$/l·hr. Aerobic micro-organisms convert unstable pollutants into stable, non-putrescible compounds.

Thus, combining, for example, untreated waste water in an aeration tank with a well aerated activated sludge which is super-abundant with aerobic micro-organisms can be used to convert unstable pollutants into stable compounds. The rate at which this conversion occurs can further be controlled by the amount of aeration of the sludge. The micro-organisms adsorb and absorb suspended and dissolved pollutants from the untreated waste water as they are further stimulated by the addition of dissolved oxygen to reduce the pollutants to stable compounds.

The mixed liquor, of micro-organisms and stable compounds can then conveyed into a clarifier tank, if desired. In the clarifier, the solids, aerobic micro-organisms and stable compounds, are induced to separate from the water transport media and settle to the bottom of the clarifier. The solids are then returned to the incoming end of the aeration tank as super-abundant micro-organisms.

Wastewater is conventionally initially mixed, in the first stage, with activated sludge with the simultaneous introduction of molecular oxygen in the form of air, gas having a higher oxygen concentration than air, or ozone. By virtue of the activity of the aerobic microorganisms contained in the activated sludge, the organic pollutants of the wastewater are, decomposed or degraded, the specific mechanism being conversion, in part, into bacterial substance and, in part, into $CO_2$ and water. The overall effect in the first stage is an oxidation of the carbon compounds of the fluid coining into the system. The microorganisms in this stage require oxygen to maintain their metabolic function, as well as for growth and multiplication, for rapidly degrading the organic substances in the wastewater. The microorganisms are relatively compact, i.e., sufficiently low density and low surface to volume ratio, so that they can be removed as settled sludge in a post clarification tank. The purified wastewater and sludge are then discharged from the post clarification tank. A portion of the discharged sludge, containing settled microorganisms, is recycled into the first treatment stage to maintain a desired quantity of microorganisms in the wastewater-activated sludge mixture, whereby the biological process operates continuously.

Sludge can be transported at a variable rate throughout the day to essentially feed the plant an amount of sludge that is optimized to correspond to an amount of water being processed. In some embodiments, a purified water rich in nitrate denitrification is processed. The presence of nitrate, enables a cheaper phosphorous precipitation to be obtained.

In addition to the biological degradation of the organic substance, a chemical degradation can simultaneously be conducted in a second stage comprising oxidizing ammonium nitrogen to nitrite and nitrate in the presence of primarily autotrophic bacteria. The bacteria in this second stage is supplied with air or a gas having a larger volume % of oxygen than air. The chemical degradation conducted in the second stage is the nitrification of the wastewater, and is conducted in most cases after the major portion of biological degradation has occurred in the first stage. An intermediate clarification tank can be provided between the first and second stages.

Treatment of the wastewater at least in part with gas (air, oxygen, ozone) in the presence of activated sludge to conduct biological degradation of organic substrate, results in a wastewater activated sludge mixture that is withdrawn from the treatment zones and divided into purified water and activated sludge. The activated sludge can then at least partially recycled into the treatment zones, and/or processed by a bioreactor. Nitrification in at least one of the treatment stages in the presence of a macroporous carrier material for carrying nitrifying bacteria also occurs. The treatment of wastewater at least in part with gas is controlled, real time, in response to a parameter detected by a sensor within the system such that more or less gas is provided to the system to either speed up or slow down the reaction. Parameters include, but are not limited to pH. For example, pH in the range of 6.5 to 8.4 would be considered a suitable pH for irrigation water.

Other parameters of interest include, for example, total salt concentration, electrical conductivity, sodium absorption ratio, the presence of toxic ions, and the presence of trace elements and heavy metals. The parameters may be relevant to controlling the reaction by, for example, changing the rate of flow of the waste water and/or sludge, changing the rate of aeration, and/or changing the rate at which a reaction enhancing additive is provided to the system.

Additional parameters are provided in Table 2:

TABLE 2

WASTEWATER MEASURABLE PARAMETERS

| Parameters | Symbol | Unit |
|---|---|---|
| Physical | | |
| Total dissolved solids | TDS | mg/l |
| Electrical conductivity | $Ec_w$ | $dS/m^1$ |
| Temperature | T | °C. |
| Color/Turbidity | | $NTU/JTU^2$ |
| Hardness | | mg equiv. $CaCO_3$/l |
| Sediments | | g/l |
| Chemical | | |
| Acidity/Basicity | pH | |
| Type and concentration of anions and cations: | | |
| Calcium | $Ca^{++}$ | $me/l^3$ |
| Magnesium | $Mg^{++}$ | me/l |
| Sodium | $Na^+$ | me/l |
| Carbonate | $CO_3^{--}$ | me/l |
| Bicarbonate | $HCO_3^-$ | me/l |
| Chloride | CL | me/l |
| Sulphate | $SO_4^{--}$ | me/l |
| Sodium adsorption ratio | SAR | |
| Boron | B | $mg/l^4$ |
| Trace metals | | mg/l |
| Heavy metals | | mg/l |
| Nitrate-Nitrogen | $NO_3$—N | mg/l |
| Phosphate Phosphorus | $PO_4$—P | mg/l |
| Potassium | K | mg/l |
| Pharmaceutical Compounds | | mg/l |
| Hormones | | mg/l |
| Metabolic by products | | mg/l |

The use of a macroporous substance having a low specific gravity as the carrier or substrate material for the nitrifying bacteria provides a large active surface area for colonization, thereby permitting the bacteria colonies to be distributed uniformly throughout the treatment system. By being cultivated in the macropores of the substrate material, the nitrifying bacteria are thus forced to grow in a decentralized mode, whereby a substantially larger mass transfer area is obtained than in the case of the conventional flocculant activated sludge. Because the BOD load in the second stage is minor, there is no significant danger of an excessive sludge production due to autoxidation, irrespective of the high surface area exposed to microbiological growth. Since the nitrifying bacteria are also firmly fixed in the macropores of the carrier material, and the latter can be readily retained in the reactor, the danger that the nitrifying bacteria might drift off into the drainage canal is eliminated, thus permitting the secondary stage to be operated without a post clarification stage. Simultaneously, the floating sludge problem is also removed, which otherwise occurs in a post clarification stage due to denitrification problems. The use, for example, of a low specific gravity carrier, assuming this carrier is in the form of relatively small discrete particles, facilitates vigorous circulation means of the oxygen-containing gas (air and/or industrial oxygen and/or ozone) introduced into the reactor in the form of fine, e.g. 0.1 to 1.5 mm, medium-sized, e.g. 1.5 to 3 mm, or larger, e.g. 3 to 10 mm bubbles to maintain the nitrification process. The resultant turbulence can optionally be intensified by the use of mechanical means, e.g., a circulating pump or stirrer. In one embodiment, a polyurethane foam is used as a carrier material.

Anaerobic zones may be created inside the carrier by limiting the concentration of the dissolved oxygen in a particular location to about 1 to 3 mg $O_2$/l or by selecting the diameter of the individual particles to be within the upper range, e.g., preferably about 15 to 50 mm of the values indicated, whereby denitrification also takes place in the reactor in addition to the nitrification. The anaerobic zones may be controlled by a controller which adjusts the amount of dissolved oxygen made available to the location.

In order to promote the biochemical removal of organic waste by aerobic bacteria and other biological life as just described, it is necessary to provide sufficient oxygen to support the aerobic biological activity. To this end, in the aeration stage of the typical activated sludge process of sewage treatment, bubbles of air have been introduced into the mixed liquor in the aeration tank. Air contain only about 23 percent by dry weight of oxygen, thus it is advantageous to administer bubbles of oxygen enriched gas containing as much as 90 or 95 percent of oxygen by weight.

In a one-stage activated sludge sewage system, clarified supernatant liquid is drawn off from the top of the settling and clarifying tank and may then discharged. In a two-stage activated sludge system, the supernatant liquid from the settling and clarifying tank is introduced into a further oxygenation or oxygen treatment zone where nitrification—that is the conversion of dissolved ammonia to nitrate salts—takes place. The nitrification tank is, in turn, followed by a settling and clarifying tank from which settled activated sludge is returned to the nitrification tank, and from which supernatant liquid may if desired be discharged as plant effluent.

Activated sludge alone does not achieve complete purification of the aqueous waste material being treated. Thus, in a typical activated sludge sewage treatment plant of either the one-stage or two-stage type, organic waste ordinarily remains in the supernatant liquid flowing from the final settling and clarifying tank in an amount producing a fecal coli count of up to as much as $10^5$ for every 100 cc of effluent.

As a practical matter, the effluent discharged from any such plant without further treatment is bound to contain a significant amount of oxidizable material representing Chemical Oxygen Demand (COD), including biodegradable organic matter representing residual Biological Oxygen Demand (BOD). While most of the BOD fed to an activated sludge treatment system is assimilated by the aerobic bacteria in the system, even in a well operated plant there will unavoidably be residual BOD in the effluent consisting of highly dispersed bacteria that escaped sedimentation and removal.

The bacteria include potentially pathogenic forms, and in addition the effluent will contain other pathogenic agents in the form of viruses. The discharge of these bacteria and viruses into public waters could promote the spread of communicable diseases, and additional treatment by disinfection is therefore ordinarily required by public health laws before plant effluents are discharged to the receiving waters. As an example, the regulations of the United States Environmental Protection Agency require that the fecal coli count of treated sewage effluent be no greater than 200 per 100 cc. of effluent. Such disinfection has conventionally been accomplished by the use of various chlorinating agents which have been found to have an effective bactericidal action.

The effectiveness of ozone as a general disinfecting agent has been known for a very long time. As one example, the well known bactericidal properties of ozone have led to the use of ozone, particularly in Europe, for the sterilization of drinking water.

Treatment of the effluent of sewage treatment plants with ozone—in the form of air or oxygen containing a few percent of ozone—has been widely suggested as an alternative to chlorination. Ozonation of sewage treatment plant effluent has been found to be very effective for disinfection of the effluent. Additionally, ozonation can impact the speed of the reaction. However, it has not been available on a scale to make it commercially feasible to include in an onsite water treatment system.

Real time testing and regulating of the water treatment process at one or more locations and times during processing enables the onsite water system to achieve water quality sufficient to enable local re-use of the water.

Turning now to FIG. 4b a system is illustrated showing the elements of a system for treating at least gray water. Additional systems can be set up either in sequence or in parallel. Once source separation is achieved, parallel treatment systems that are targeted toward the source of the water while taking into consideration the climate and ecosystem of the system installation can be deployed without departing from the scope of the invention.

As illustrated, water is separated by source where the sources are identified as household gray water, household black water and natural sources (e.g., rainwater). For purposes of simplifying the explanation, a single system for treatment is illustrated. However, as would be appreciated by those skilled in the art, the system is designed to be modular and compact in order to facilitate residential use (e.g., in the range of 10-2500 gallons of water/day; storage capacities of 500-25,000 gallons with a size configurable to store the target number of gallons). Additionally the system can be designed in parallel such that once the water is separated by source, each source separated water enters its own treatment system and thereafter is combined for return to the residence, or is separately returned to the residence as a function of the source (e.g., black water, treated and returned to the house for use in the toilet; gray water, treated and returned to the house for laundry use, etc.).

Large particulate matter can be removed, for example, a course filtration filter 402. Suitable filters include, for example, a nylon stocking, or paper filter. The filter system 402 can be configured in a variety of ways that would be apparent to those skilled in the art. One mechanism provides for a rotating canister filter system that communicates the status of the filter to a controller. Once the filter ceases to efficiently process water (e.g., the filter is full), the canister rotates to expose a new filter. Such a rotating filter canister decreases the frequency at which maintenance is performed on the system. Additionally, the filter can be configurable to contain one or more sensors that detect the presence of or an amount that exceeds a preset limit of material that would be harmful to the water treatment system or which might impact the biological activity of the system (e.g., bleach). In such an event, the sensor can send a signal to a control valve down stream that prevents the passage of water to the system and issues an alarm that the system requires maintenance or attention.

Once the water passes through the course filter 402, the water is placed into a settlement tank 410, or surge tank, for holding. As discussed above, while the water is in the settlement tank 410, additional materials may either settle to the bottom of the tank or float to the top, where it can be removed. After this optional second stage of removal, water is then transferred to the aeration tank 426 where the water is stirred (e.g., with a paddle or mixer) which causes aeration of the water. Additionally, or in the alternative, oxygen can be added to the water in the aeration tank or any other technique can be used to cause controlled aeration. Aeration of the water is useful to prevent harmful bacteria from propagating in the water. The disinfector 430 can be, for example, an ozonator, a UV light source, a heat source, a distillation system, a reverse osmosis system, and/or a chemical treatment processor. The systems can be controlled or regulated by one or more regulators 440 configurable to adjust a parameter in response to a control signal. Furthermore, where more than one disinfector is provided, the disinfector can be activated in series, in parallel or selectively activated in response to a parameter from the tester.

Additional filters can be provided in the system as well without departing from the scope of the invention. Additional tanks can also be provided without departing from the scope of the invention.

For example, a tester can also be configurable to test the water in the aeration tank. Suitable testers would be apparent to those skilled in the art and can include, for example, pH testers, bacteria testers, etc. to determine the water quality and whether and how much bacteria or other materials known to those skilled in the art that would impact the rate of the biological reaction should be added to assist in the water treatment process. Testing of the water can occur at timed intervals. e.g. in response to a controller, at several points along the process, if desired, including when water is initially placed into the tank. A timer can be configurable to communicate with the tester to facilitate timed testing of the water. The bacterial growth surface can then be configurable to expose bacterial to the water environment in the chamber in a time release fashion, by, for example, coating the surface with a material which dissolves over time to expose a predetermined amount of bacteria. In another embodiment, bacteria is maintained in a bacteria release container which then releases a selected amount of bacteria at intervals, either on demand, or as a result of time release.

Additionally, a control mechanism can be provided which controls the operation of the sub-systems, for example, the rate and/or timing of testing, the rate and/or timing of bacteria addition, the rate and/or timing of aeration (stirring or oxygen addition). Additionally, the control mechanism can be configurable to receive input from any of the sub-systems, such as the testing device, the bacteria delivery device or the aeration system. Information in the control mechanism can then be used to determine intervals for further bacteria or oxygen delivery and/or testing. Additionally the control mechanism can be adapted to signal an alarm if the water quality levels indicate that a filter needs servicing. Additionally, or in the alternative, the control mechanism can be configurable to communicate with a remote or central station to identify water quality levels, bacteria levels (either in the water, or in the bacteria delivery system), as well as filter replacement and system servicing requirements.

If required, as discussed above, bacteria are added from a bacteria dispenser to aeration tank 426 to further assist in the treatment of the water. Addition of bacteria can be controlled by the controller in response to testing results and/or by the central station. Thereafter, the water is tested at least one more time before transferring to a final filtration unit. Suitable filter mechanisms would be apparent to those skilled in the art. Similar to the filters described above, a rotating canister filter system that communicates the status of the filter to a controller can be used. Once the filter ceases to efficiently process water (e.g., the filter is full), the canister rotates to expose a new filter. Such a rotating filter canister decreases the frequency at which maintenance is performed. After final filtration, the water can be further tested and/or purified, e.g. by treatment with U.V. light or ozonation prior to returning the water for residential use (whether landscaping or inside).

Figure 5A:
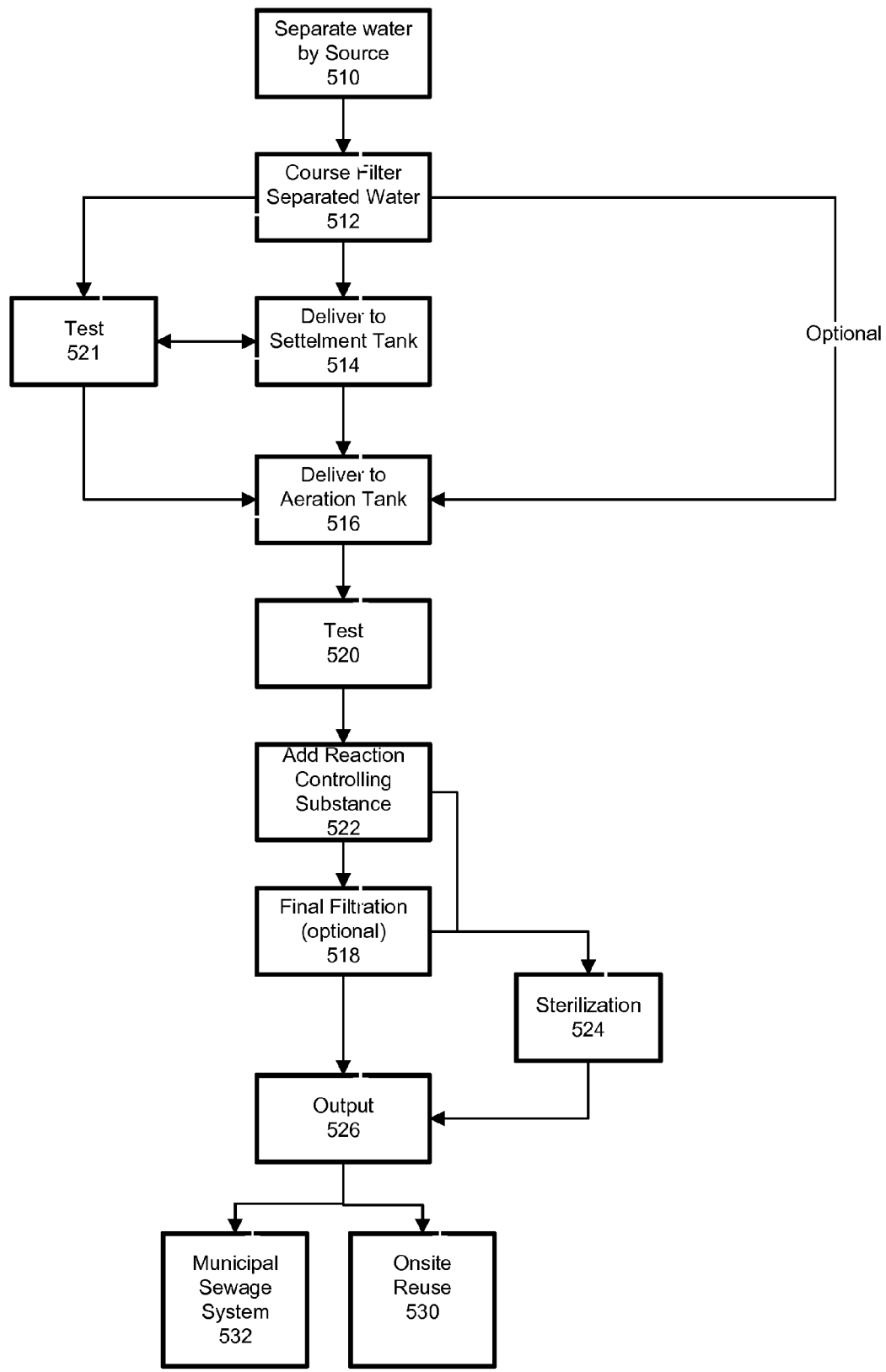
FIGS. 5a-b are flow charts illustrating steps engaged in by systems and methods of the invention.

Turning now to FIG. 5a, a flow chart is illustrated that sets forth steps of a method of performing the invention. In an initial optional step, water entering a system is identified and separated by source 510. Typically, water is separated into gray water and black water. Separation can be achieved using suitable mechanical means, e.g., separate plumbing as would currently be required by most residential building codes in the United States, or by using one or more water quality sensors that are provided at an input (e.g., along an input pipe). Once the water is separated, each of the separated waters can be separately treated in its own modularized treatment system, or, for example, black water can be directed into a municipal sewage system while gray water and/or natural source water (such as rain water obtained through a catchment system) is directed into its own modularized treatment system, or the same treatment system. The separation step can be performed at an initial stage or later on in the process as will be appreciated by reviewing FIGS. 3a-d.

Once the water is separated by source, large particulate matter may be removed by, for example, course filtration 512, such as, for example, by using a nylon stocking, paper filter, or other suitable filter mechanism capable of capturing larger particles.

Conventionally, installations for treating water with a view to making it potable generally comprise a succession of physical/chemical treatment units of the flocculation/decantation/filtration type, complemented by an oxidation unit.

Flocculation may also be employed, which constitutes a physical/chemical step designed to modify the state of the colloidal particles contained in the water by the addition of, for example, a coagulant. (aluminum chloride polymer, alumina sulfate, ferric chloride, etc.) in order to enable their elimination by decantation.

Microorganisms, micropollutants, compounds (ferrous iron, manganese, etc.) that cannot be eliminated by flocculation are, for their part, destroyed by the use of powerful oxidants such as ozone, chlorine or again chloride dioxide. The elimination of the micropollutants can also be done by stripping (forced air circulation) if they are volatile or by adsorption on activated carbon. The latter methods have the drawback however of not destroying the pollution unlike the oxidants. Ozone can be used, alone or in combination with hydrogen peroxide or ultraviolet radiation, to make consumption water potable. A standard installation for the treatment of water with a view to making it potable could thus be constituted by a flocculation unit followed by a decantation unit, a filtration unit (for example on sand), an ozonization unit, a filtration unit on granular or powdered activated carbon and finally a disinfection unit.

The filtration units conventionally used in such potable-water installations may advantageously have two layers of filtering materials and notably a first layer of granular carbon placed above a second layer of sand. The use of such superimposed layers of filtering materials makes it possible to obtain an efficient retention of the particles contained in the water to be treated provided that the beds of granular materials are regularly washed. Once the water has been course filtered 512, the water is placed into a settlement tank 514 or surge tank for holding. While the water is in the settlement tank, additional non-water materials may either settle to the bottom of the tank, or float to the top, where the materials can be removed, e.g. by skimming the top of the water with a paddle to remove the film. Anaerobic processing typically occurs in the settlement tank. Furthermore, testing 521 and addition of materials, such as bacterial or enzymes, can also be performed to optimize the performance of the anaerobic processing in the settlement tank.

Water is then transferred from the settlement tank 514 to an aeration tank 516 where the water is aerated (e.g., stirred with a paddle or mixer or aerated via a bubbler). Oxygen or ozone can be added to provide an additional level of aeration (e.g. using a bubbler or aeration system). Furthermore the rate at which oxygen or ozone is added can be adjusted to optimize the aeration process. The adjustment of the rate of delivery of oxygen or ozone can, furthermore, be in response to a sense parameter from the aeration tank. Testing 520 can occur on a continual or regular basis to facilitate this process.

Additionally, testing 520 of the water may occur (such as pH, bacteria count, etc.) by providing a tester configurable to determine whether and how much bacteria should be added to assist in process. Any parameter appropriate for measuring, as identified by those skilled in the art, are contemplated.

Testing can occur at timed intervals, if desired, or when water is initially placed into the tank or continuously. If required, bacteria or other material are added to aeration tank to further assist in the treatment of the water. Suitable bacteria are available to those skilled in the art, for example from Acorn Biotechnical Corporation, which manufactures bacterial cultures and enzymes for use in cleaning compounds and water treatment, Acorn Biotechnical Corporation, BioExport Ltd., Bioscience, Inc., and others that would be known to those skilled in the art.

In one embodiment, bacteria may be added by providing a bacteria growth surface within the aeration chamber which has a large surface area of contact with water (e.g., by providing tubules or grids) which has been embedded with bacteria. Thereafter, the water is tested at least one more time before transferring to an optional final filtration 218 unit. After final filtration, the water can be further tested and/or purified prior to returning the water for residential use (whether landscaping or inside). Testing and/or bacteria addition can be controlled by a controller within the device and/or by a central station to which a controller within the device is adapted to communicate.

One or more sterilization 524 process can optionally be performed. The output 526 can be forwarded to the municipal sewage system 532 or reused on site 530. Prior to onsite reuse, the output 526 is tested again to determine whether the output meets desired parameters for reuse.

Figure 5B:
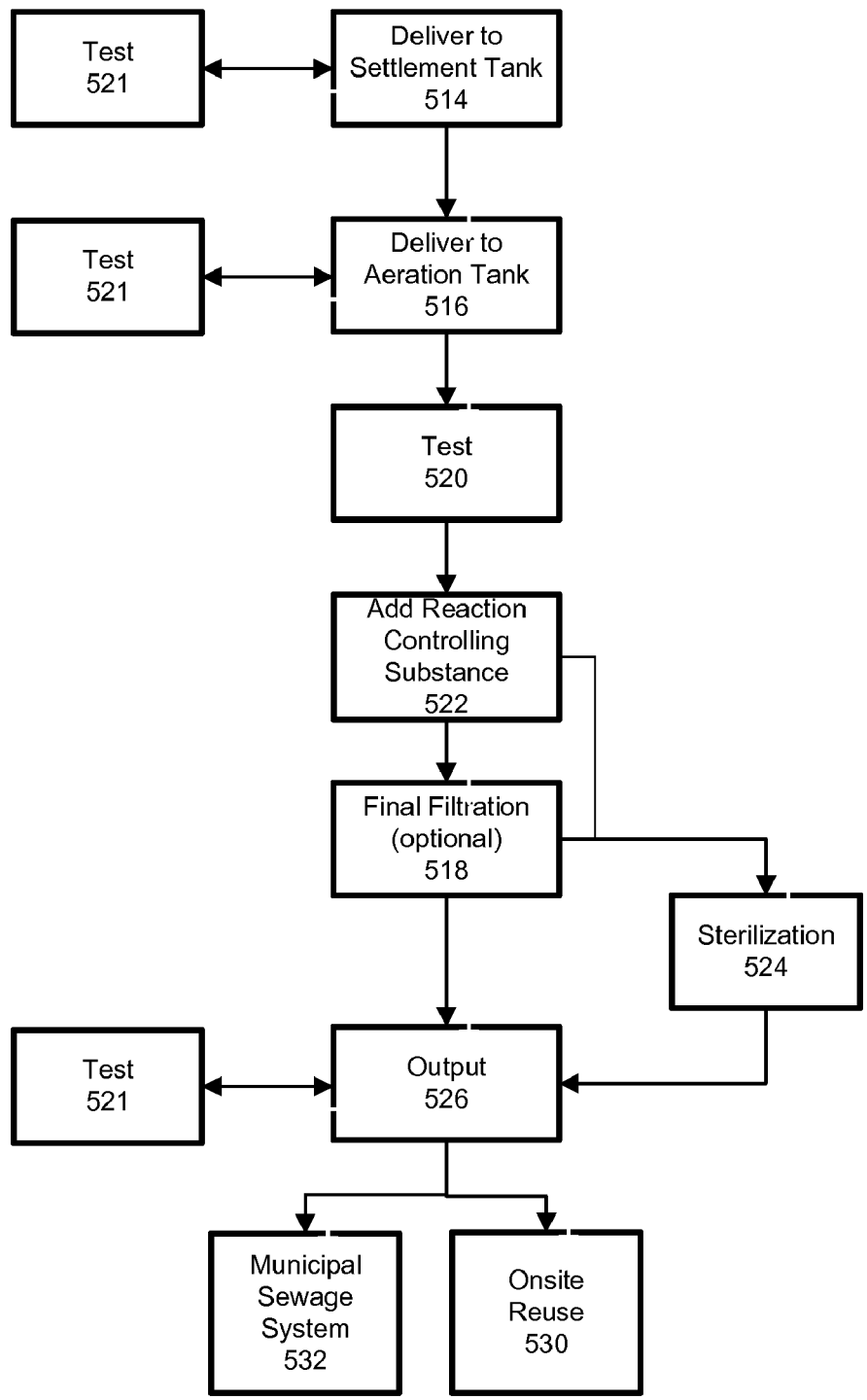

Turning now to FIG. 5b, a flow chart is illustrated that sets forth steps of a method of performing the invention. Water, such as wastewater, from a source is delivered directly to the settlement tank 514. An optional separation step can be performed using suitable mechanical means, e.g., separate plumbing as would currently be required by most residential building codes in the United States, or by using one or more water quality sensors that are provided at an input (e.g., along an input pipe) at various stages, if desired. The separation step can be performed at an initial stage or later on in the process as will be appreciated by reviewing FIGS. 3a-d.

As discussed above, installations for treating water with a view to making it potable generally comprise a succession of physical/chemical treatment units of the flocculation/decantation/filtration type, complemented by an oxidation unit.

While the water is in the settlement tank, additional non-water materials may either settle to the bottom of the tank, or float to the top, where the materials can be removed, e.g. by skimming the top of the water with a paddle to remove the film. Anaerobic processing typically occurs in the settlement tank. Furthermore, testing 521 and selectively controllable addition of materials, such as bacterial or enzymes, can also be performed to optimize the performance of the anaerobic processing in the settlement tank.

Water is then transferred from the settlement tank 514 to an aeration tank 516 where the water is aerated (e.g., stirred with a paddle or mixer or aerated via a bubbler). Oxygen or ozone, for example, can be added in the reaction controlling step 522 to provide an additional level of aeration (e.g. using a bubbler or aeration system). Furthermore the rate at which oxygen or ozone is added can be adjusted to optimize the aeration process. The adjustment of the rate of delivery of oxygen or ozone can, furthermore, be in response to a sense parameter from the aeration tank. Testing 520 can occur on a continual or regular basis to facilitate this process. Alternatively, the rate at which water is processed through the system can be adjusted.

Additionally, testing 520 of the water may occur (such as pH, bacteria count, etc.) by providing a tester configurable to determine whether and how much bacteria should be added to assist in process. Any parameter appropriate for measuring, as identified by those skilled in the art, are contemplated.

Testing can occur at timed intervals, if desired, or when water is initially placed into the tank or continuously. If required, bacteria or other material are added to aeration tank to further assist in the treatment of the water. Suitable bacteria are available to those skilled in the art, for example from Acorn Biotechnical Corporation, which manufactures bacterial cultures and enzymes for use in cleaning compounds and water treatment, Acorn Biotechnical Corporation, BioExport Ltd., Bioscience, Inc., and others that would be known to those skilled in the art.

In one embodiment, bacteria may be added by providing a bacteria growth surface within the aeration chamber which has a large surface area of contact with water (e.g., by providing tubules or grids) which has been embedded with bacteria. Thereafter, the water is tested at least one more time before transferring to an optional final filtration 218 unit. After final filtration, the water can be further tested and/or purified prior to returning the water for residential use (whether landscaping or inside). Testing and/or bacteria addition can be controlled by a controller within the device and/or by a central station to which a controller within the device is adapted to communicate.

One or more sterilization 524 processes and testing 521 processes can optionally be performed. The output 526 can be forwarded to the municipal sewage system 532 or reused on site 530. Prior to onsite reuse, the output 526 is tested again to determine whether the output meets desired parameters for reuse.

Figure 2:
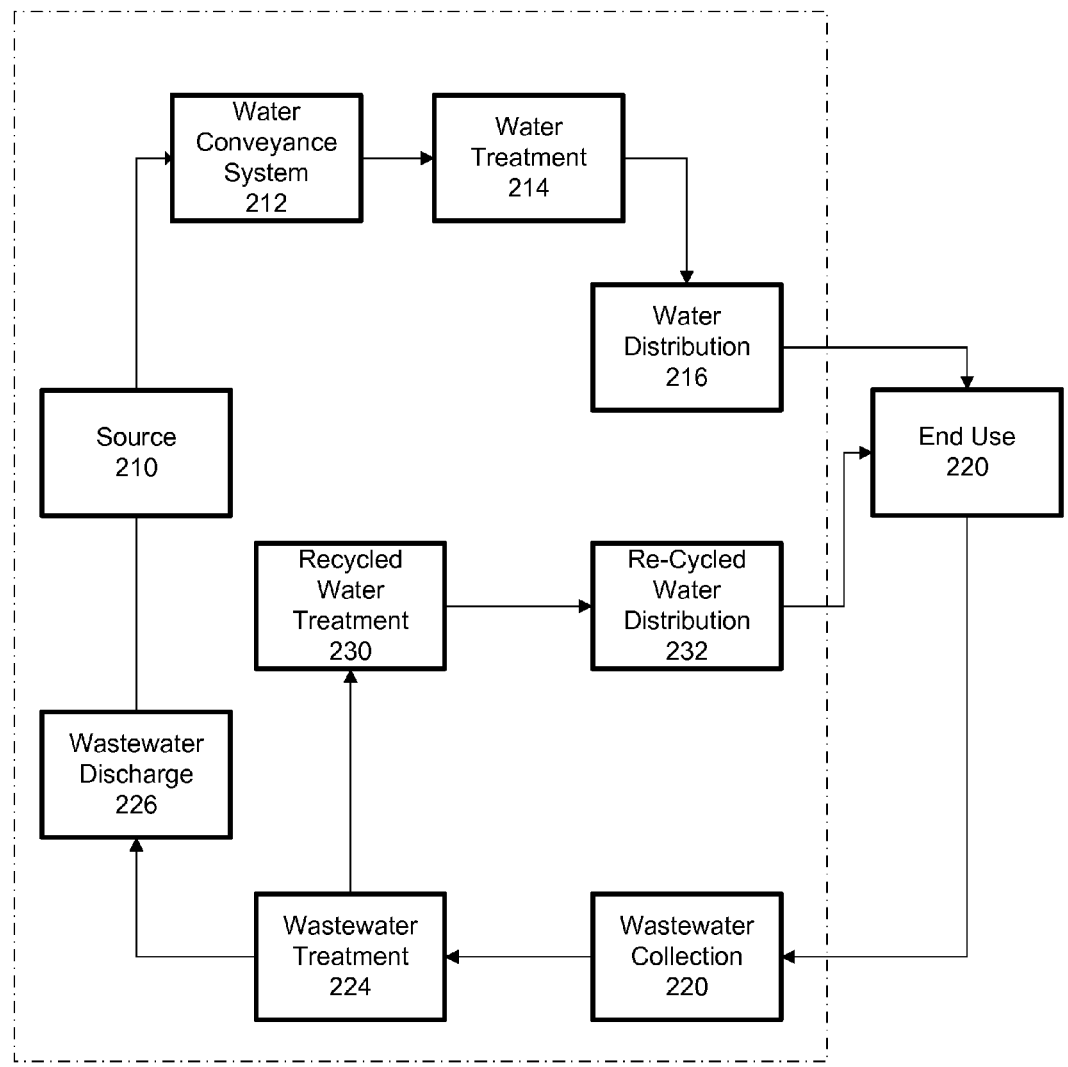
FIG. 2 illustrates the flow of water under current solutions.
Figure 6:
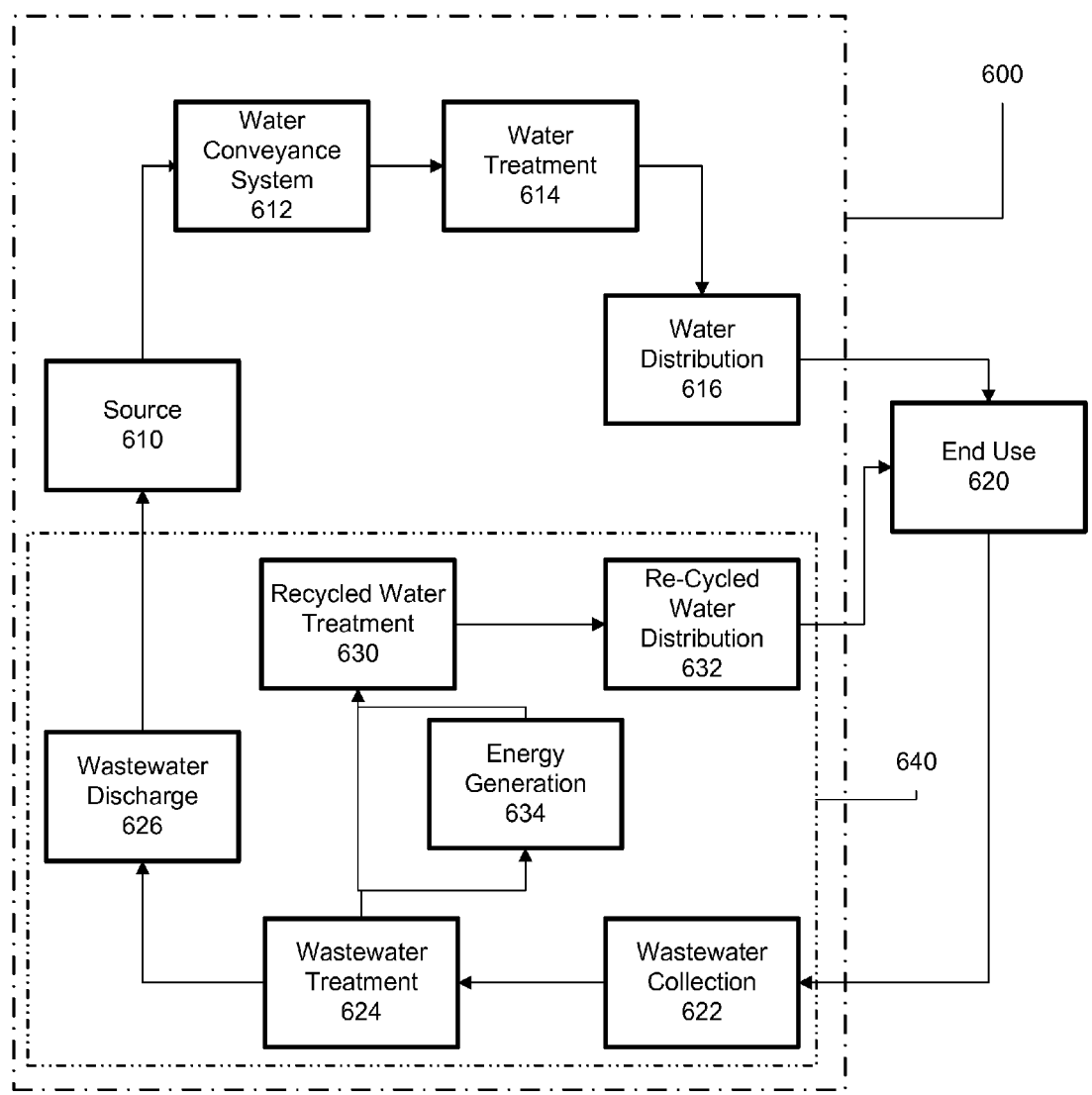
FIG. 6 illustrates changes to the flow of water enabled by the invention.

The current use of water is shown in FIG. 2. Water processing enabled by this invention substantially changes the manner in which water is used and processed and the amount of energy used to process water as illustrated in FIG. 6. Water would still be obtained from a source 610 such as a well, river, lake, reservoir, or municipal water source. The water would then conveyed by a water conveyance system 612 and subjected to some level of treatment 614 before being distributed 616 to the end user 620. However, once the end user uses the water, e.g., by showering, laundry, cooking, etc., collectable water is collected 622 and subjected to treatment 624. The treated water is then either discharged 626, e.g., back into the source 610, or reused 632 by the original end user onsite after testing 636. Additionally, some energy generation 634 may occur during the treatment process further reducing the energy load of the system. Additionally, as will be appreciated by those skilled in the art, the sub-steps 640 occur onsite instead of remotely.

As will be appreciated by those skilled in the art, much organic waste contains various substances that, when treated properly, can be converted to methane ($CH_4$). Methane production by known biological treatment processes, such as anaerobic fermentation (also called anaerobic digestion), involves the conversion of organic matter to methane and carbon dioxide at modest temperatures, ambient pressures, and nearly neutral pH. Anaerobic fermentation is typically carried out in the absence of exogenous electron acceptors such as oxygen, nitrate, and sulfate through a series of microbial interactions. Conventional anaerobic fermentation is often used for waste water treatment.

Methanogens (i.e., methane-producing bacteria) have been studied for their utility in digestion processes for producing methane. Because of the limited number of substrates catabolized by methanogens, however, to degrade complex organic substrates to methane by anaerobic digestion, other organisms are necessary as well. A typical anaerobic digester, therefore, will normally contain a mixture of fermentative bacteria, acetogenic bacteria, and methanogenic bacteria.

Fermentative bacteria convert hydrolyzed polymers (soluble sugars, peptides, and long chain fatty acids) to organic acid and alcohol intermediates. These intermediates are then converted into hydrogen, carbon dioxide, and acetic acid by acetogenic bacteria, followed by conversion of the hydrogen, carbon dioxide, and acetic acid into methane by the methanogenic bacteria. The conversion of the acid and alcohol intermediates into methane is slow, relative to the rates of conversion of hydrogen and carbon dioxide into methane. Thus, in some embodiments, an anaerobic digester can be provided in the system. To enhance the performance of the anaerobic digester, the digester can be adapted and configures such that it is maintained in a "green house" environment at an elevated temperature ranging from about 20° C. to about 55° C. The green house preferably utilizes a solar energy source to maintain the elevated temperature. Sludge obtained is passed through the anaerobic digester for the generation of additional biogas. The organic material is then converted to electricity by, for example, collecting the sludge, generating a refined biogas component containing sulfer from the sludge and introducing the sulfer-containing biogas component into a high-temperature sulfer tolerant fuel cell. The fuel cell then converts the biogas component to electricity by an electrochemical process without significant degradation of the performance of the fuel cell.

Additionally, as described above, ultraviolet (UV) light can be used in the system. For example, UV light can be applied to the water exiting the system to provide an additional sterilization process. Additionally, UV can be used to assist in the ozonation water treatment process.

TABLE 3

POTENTIAL ENERGY INTENSITY SAVINGS FOR WATER-USE CYCLE SEGMENTS

| Water-Use Cycle Segments | Range and Percentage of Energy Intensity (kWh/MG) Kilowatt hours/Millions of Gallon | | | |
|---|---|---|---|---|
| | Low | Percentage | High | Percentage |
| Water Supply and Conveyance (612) | 0 | 0 | 14000 | 37.42% |
| Water Treatment (614) | 45 | 4.35% | 7200 | 42.77% |
| Water Distribution (616) | 315 | 30.43% | 540 | 3.21% |
| Wastewater Collection and Treatment (620, 624) | 0 | | 0 | |
| Wastewater Discharge (626) | 0 | 0% | 0 | |
| Recycled Water Treatment and Distributions (630, 632) | 0 | | 0 | |
| TOTAL | 360 | 100% | 21740 | 100% |
| Potential Energy Savings | 1940 | | 15930 | |
| Percentage Allocated Savings per End User | 15.65% | | 57.41% | |

Because the water is processed and tested onsite, the energy required for supply and conveyance 612, treatment 614 and distribution 616 is reduced. One aspect of the reduction is directly proportional to the fact that roughly 20-30% of water is used for landscaping purposes. Drawing water for purpose of landscaping would substantially be eliminated thereby reducing the water supply and conveyance amount on average 25%. Further reduction in energy demand would be achieved because up to 60% of water used onsite could be reused thereby further reducing the overall draw of an individual from the water system. Thus, each unit could achieve an allocated energy savings of between 15 and 57 percent for an individual's energy footprint on the water use cycle.

Systems configured according to this disclosure are configurable to have a cleaning level of: BOD<25 g/l; COD<125 mg/l, P<1.5 mg/l, SS<35 mg/l, and more preferably BOD<10 g/l; COD<75 mg/l, $NH_4$<5 mg/l, P<1.5 mg/l, SS<15 mg/l. The systems typically are adaptable to process between about 500 and about 100,000 gallons per day, and store between about 10,000 and about 1,000,000 gallons. Thus, the systems are adaptable to process between 65 cubic feet and about 13,368 cubic feet, and store between about 1,368 cubic feet and about 133,680 cubic feet.

A variety of U.S. patents that may be of interest to persons of skill in the art in further understanding the implementation of this disclosure include, but are not limited to U.S. Pat. No. 3,930,998 Wastewater treatment; U.S. Pat. No. 3,960,717 Process for treating waste water; U.S. Pat. No. 3,964,998 Improvements in and relating to waste water treatment; U.S. Pat. No. 3,994,802 Removal of BOD and nitrogenous pollutants from wastewaters; U.S. Pat. No. 4,056,465 Production of non-bulking activated sludge; U.S. Pat. No. 4,132,637 Ozone disinfection in waste water treatment with recycling of ozonation off gas; U.S. Pat. No. 4,153,544 Method of treating organic waste water, U.S. Pat. No. 4,160,723 Method and apparatus for removal of pollutants from waste water; U.S. Pat. No. 4,162,153 High nitrogen and phosphorous content biomass produced by treatment of a BOD-containing material; U.S. Pat. No. 4,173,531 Nitrification-denitrification of wastewater; U.S. Pat. No. 4,202,763 High-efficient activated sludge method; U.S. Pat. No. 4,415,454 Nitrification treatment of wastewater; U.S. Pat. No. 4,479,876 Process and apparatus for the biological purification of wastewater; U.S. Pat. No. 4,568,462 Method of treating sewage in sewage treatment installations having an adsorption stage; U.S. Pat. No. 4,693,827 Process for protection of biological nitrification systems; U.S. Pat. No. 4,961,854 Activated sludge wastewater treatment process; U.S. Pat. No. 4,975,197 Orbal wastewater treatment process; U.S. Pat. No. 5,316,832 Biodegradable sheet for culturing sewage denitrifiers; U.S. Pat. No. 5,382,369 Waste water-treatment process; U.S. Pat. No. 5,407,566 Apparatus for disposing of waste water, U.S. Pat. No. 5,472,611 Process and apparatus for purification of wastewater; U.S. Pat. No. 5,531,896 Process for disposing of waste water; U.S. Pat. No. 5,607,593 Installation for making water potable with submerged filtering membranes; U.S. Pat. No. 5,654,198 Detectable water-treatment polymers and methods for monitoring the concentration thereof; U.S. Pat. No. 5,658,993 Water-soluble or water-dispersible graft copolymers, the preparation thereof and the use thereof; U.S. Pat. No. 5,792,360 Water treatment system comprising water-soluble glass; U.S. Pat. No. 5,837,142 Membrane process for treating sanitary wastewater; U.S. Pat. No. 6,099,731 Method and apparatus for treating water; U.S. Pat. No. 6,132,629 Method and apparatus for continuous or intermittent supply of ozonated water; U.S. Pat. No. 6,146,524 Multi-stage ozone injection water treatment system; U.S. Pat. No. 6,150,618 Automatic testing device; U.S. Pat. No. 6,183,643 Method and apparatus for denitrification of water; U.S. Pat. No. 6,276,304 Ozone injection system; U.S. Pat. No. 6,280,633 Ozone sensor and method for use of same in water purification system; U.S. Pat. No. 6,295,864 Analysis system and method for water-soluble contaminants in a cleanroom environment; U.S. Pat. No. 6,312,588 Water purifier; U.S. Pat. No. 6,337,020 Method and device for purifying waste water comprising an additional sludge treatment by ozonation; U.S. Pat. No. 6,406,629 Biological process for removing phosphorous involving a membrane filter; U.S. Pat. No. 6,428,710 Process and plant for the preparation and delivery of ozonated water to a user point; U.S. Pat. No. 6,468,953 Methods of preparing antimicrobial compositions comprising ozone; U.S. Pat. No. 6,485,645 Biological process for removing phosphorus involving a membrane filter; U.S. Pat. No. 6,485,646 Process for the treatment of waste water containing ammonia; U.S. Pat. No. 6,485,696 Recovery/removal of metallic elements from waste water using ozone; U.S. Pat. No. 6,536,272 Water monitoring, data collection, and transmission module; U.S. Pat. No. 6,539,772 Method and system for testing emergency water system pressure; U.S. Pat. No. 6,551,518 Combined ozonation and electrolytic chlorination water purification method; U.S. Pat. No. 6,561,048 Water-flow testing apparatus; U.S. Pat. No. 6,592,762 Process for treating BOD-containing wastewater; U.S. Pat. No. 6,602,417 Process for the treatment of waste water containing specific components e.g. ammonia; U.S. Pat. No. 6,610,983 Methods of detecting fungus using electromagnetic radiation; U.S. Pat. No. 6,706,185 Biological method of phosphorus removal and biological phosphorus-removing apparatus; U.S. Pat. No. 6,761,825 Method for removing odors in sterilized water; U.S. Pat. No. 6,780,331 Ozonation of contaminated liquids under high pressure; U.S. Pat. No. 6,787,043 Water purification system and method; U.S. Pat. No. 6,796,436 Method and apparatus for preparing pure water; U.S. Pat. No. 6,814,877 Method of producing at least one of chlorite, chlorine dioxide and chlorate by combining the reactions of ozonation and electrolytic chlorination; U.S. Pat. No. 6,921,476 UV-assisted advanced-ozonation water treatment system and advanced-ozonation module; U.S. Pat. No. 7,005,069 Apparatus and method for aeration of wastewater; U.S. Pat. No. 7,008,539 Submerged ammonia removal system and method; U.S. Pat. No. 7,008,543 Use of chlorine dioxide and ozone for control of disinfection by-products in water supplies; U.S. Pat. No. 7,011,750 Water treatment device; U.S. Pat. No. 7,012,394 Battery-powered air handling system for subsurface aeration; U.S. Pat. No. 7,014,173 Cyclic aeration system for submerged membrane modules; U.S. Pat. No. 7,014,769 Method for reducing nitrate concentration in wastewater; U.S. Pat. No. 7,018,532 Aeration and mixing trough; U.S. Pat. No. 7,022,223 Methods and systems for removing floating solid waste from the surface of a watercourse; U.S. Pat. No. 7,033,503 Municipal wastewater treatment apparatus and process with a continuous feed and cyclic aeration; U.S. Pat. No. 7,041,214 Waste water treatment system; U.S. Pat. No. 7,041,219 Method and apparatus for enhancing wastewater treatment in lagoons; U.S. Pat. No. 7,052,610 Immersed membrane filtration system and overflow process; U.S. Pat. No. 7,060,185 Sewage treatment apparatus using self-granulated activated sludge and sewage treatment method thereof; U.S. Pat. No. 7,063,786 Wastewater treatment bioreactor; U.S. Pat. No. 7,063,788 Apparatus for withdrawing permeate using an immersed vertical skein of hollow fibre membranes; U.S. Pat. No. 7,067,086 Microfluidic accumulating and proportioning component; U.S. Pat. No. 7,070,005 Soil aerator assembly; U.S. Pat. No. 7,077,958 Sewage treatment plant; U.S. Pat. No. 7,086,280 Aeration sensing device; U.S. Pat. No. 7,096,968 Aeration device; U.S. Pat. No. 7,100,683 In-well aeration device; U.S. Pat. No. 7,114,844 Aeration apparatus and method; RE 32,429 Production of non-bulking activated sludge; RE 39,203 Current and aeration system for wastewater plant.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed:

1. A water treatment system comprising:
   a settlement tank adaptable to receive effluent from a source;
   at least one aerobic treatment tank configurable to receive a settlement tank effluent;
   a tester configurable to test a parameter wherein the tester is configurable to test one or more of total dissolved solids, electrical conductivity, temperature, color, turbidity, hardness, sediments, acidity, basicity, calcium concentration, magnesium concentration, carbonate concentration, chloride concentration, sulphate concentration, sodium, absorption ratio, boron concentration, trace metal concentration, heavy metal concentration, nitrate-nitrogen concentration, phosphate-phosphorus concentration, potassium concentration, pharmaceutical compound, hormone, and metabolic by-products; and
   a controller configurable to control a process of the water treatment system in real-time at one or more locations and one or more times during processing in response to the tested parameter; and
   a treated and tested water output of the treatment system suitable for on-site reuse.

2. The water treatment system of claim 1 wherein the anaerobic treatment tank is in communication with an anaerobic digester.

3. The water treatment system of claim 1 wherein the tester is controlled by a timer and is configurable to test at a time interval.

4. The water treatment system of claim 1 wherein the tester is configurable to provide real-time testing data to the controller.

5. A water treatment method comprising:
   receiving an effluent from a source and delivering the effluent into a settlement tank;
   aerobically treating the effluent received from the source in an aerobic treatment tank configured to receive a settlement tank effluent;
   testing a parameter of the aerobically treated effluent with a tester configurable to test one or more of total dissolved solids, electrical conductivity, temperature, color, turbidity, hardness, sediments, acidity, basicity, calcium concentration, magnesium concentration, sodium concentration, carbonate concentration, chloride concentration, sulphate concentration, sodium absorption ration, boron concentration, trace metal concentration, heavy metal concentration, nitrate-nitrogen concentration, phosphate-phosphorus concentration, potassium concentration, pharmaceutical compound, hormones, and metabolic by-products, wherein the tester is one or more of controlled by a timer and is configurable to test at a time interval configurable to provide real-time testing data to the controller;
   performing a real-time adjustment of the aerobic treatment process of the effluent in response to a result of the tested parameter received by the controller from the tester;
   regulating the water treatment process at one or more locations and times during processing; and
   achieving water quality sufficient to enable local re-use of the treated water from the system.

6. The method of claim 5 further comprising the step of anaerobically treating the effluent from the source.

7. The method of claim 5 further comprising the step of adding a reaction controlling substance.

8. The method of claim 7 wherein the step of adding a reaction controlling substance is in response to the result of the tested parameter.

9. The method of claim 5 further comprising a filtration step prior to the step of achieving water quality sufficient to enable local re-use of the treated water.

10. The method of claim 5 further comprising the step of sterilization prior to the step of achieving water quality sufficient to enable local re-use of the treated water.

11. The method of claim 10 wherein the sterilization step is selected from an ozonator, a UV light source, a heat source, a distillation system, a reverse osmosis system, and/or a chemical treatment processor.

12. The method of claim 11 wherein the step of sterilization includes selecting more than one sterilization process and performing the sterilization in sequence, in parallel, or selectively in response to a tested parameter.

13. The method of claim 5 further comprising testing an output from the system.

14. The method of claim 5 further comprising the step of separating the effluent received from a source.

15. The water treatment system of claim 1 wherein the anaerobic digester receives sludge from the anaerobic treatment tank.

16. The water treatment system of claim 1 wherein a parameter of anaerobic bacterial activity is sensed by the tester.

17. The water treatment system of claim 1 wherein the bacterial activity is adjusted by a controller in response to the sensed parameter.

18. The water treatment system of claim 1 wherein further comprising an aeration source wherein the aeration source is configurable to deliver an aeration substance selected from the group comprising: air, purified oxygen, and ozone.

19. The water treatment system of claim 18 wherein the rate at which the aeration source delivers the aeration substance is controlled by a regulator.

20. The water treatment system of claim 19 wherein a parameter of the aeration tank is sensed by the tester.

21. The water treatment system of claim 19 wherein the rate at which the aeration substance is controlled is determined in response to a parameter measured by the tester.

22. The water treatment system of claim 1 further comprising a disinfector wherein the disinfector is one or more of an ozonator, an ultraviolet light source, a heat source, a distillation system, a reverse osmosis system, and/or a chemical treatment processor and further wherein the disinfector is activated in response to a parameter measured by the tester.

* * * * *